US012455819B2

(12) United States Patent
Kanno

(10) Patent No.: US 12,455,819 B2
(45) Date of Patent: Oct. 28, 2025

(54) MEMORY SYSTEM AND METHOD OF CONTROLLING THE MEMORY SYSTEM

(71) Applicant: Kioxia Corporation, Tokyo (JP)

(72) Inventor: Shinichi Kanno, Ota Tokyo (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/768,292

(22) Filed: Jul. 10, 2024

(65) Prior Publication Data

US 2025/0021477 A1    Jan. 16, 2025

(30) Foreign Application Priority Data

Jul. 12, 2023   (JP) ................................ 2023-114619

(51) Int. Cl.
  *G06F 12/02*  (2006.01)
(52) U.S. Cl.
  CPC .. *G06F 12/0246* (2013.01); *G06F 2212/7201* (2013.01)
(58) Field of Classification Search
  None
  See application file for complete search history.

(56) References Cited

U.S. PATENT DOCUMENTS

| 2005/0066132 A1* | 3/2005 | Houki | G06F 9/4812 |
| | | | 711/137 |
| 2012/0246387 A1 | 9/2012 | Kanno et al. | |
| 2012/0265925 A1* | 10/2012 | Miura | G06F 12/0246 |
| | | | 711/E12.008 |
| 2018/0173420 A1* | 6/2018 | Li | G06F 3/0679 |
| 2019/0163621 A1* | 5/2019 | Doh | G06F 12/0246 |
| 2020/0201785 A1 | 6/2020 | Hanna | |
| 2020/0218465 A1* | 7/2020 | Klein | G06F 12/1009 |
| 2020/0278883 A1 | 9/2020 | Tan et al. | |
| 2020/0371861 A1 | 11/2020 | Chen et al. | |
| 2020/0401331 A1* | 12/2020 | Mulani | G06F 12/1009 |

FOREIGN PATENT DOCUMENTS

JP        5221699 B2    6/2013

OTHER PUBLICATIONS

Ross et al., "OPEN Compute Project—Datacenter NVMe SSD Specification", Version 2.0, Jul. 30, 2021, 127 pages.

* cited by examiner

*Primary Examiner* — Kevin Verbrugge
(74) *Attorney, Agent, or Firm* — Maier & Maier, PLLC

(57) ABSTRACT

According to one embodiment, a memory system includes a controller. The controller manages a plurality of flags corresponding to a plurality of physical addresses. In response to receiving a read command from a host, the controller acquires from a first management table a physical address mapped to a logical address specified by the read command, and reads data from a nonvolatile memory based on the acquired physical address. The controller determines whether or not to transmit the read data to the host based on whether a current status of the flag corresponding to the acquired physical address is set to a first value indicating valid data or to a second value indicating invalid data.

20 Claims, 25 Drawing Sheets

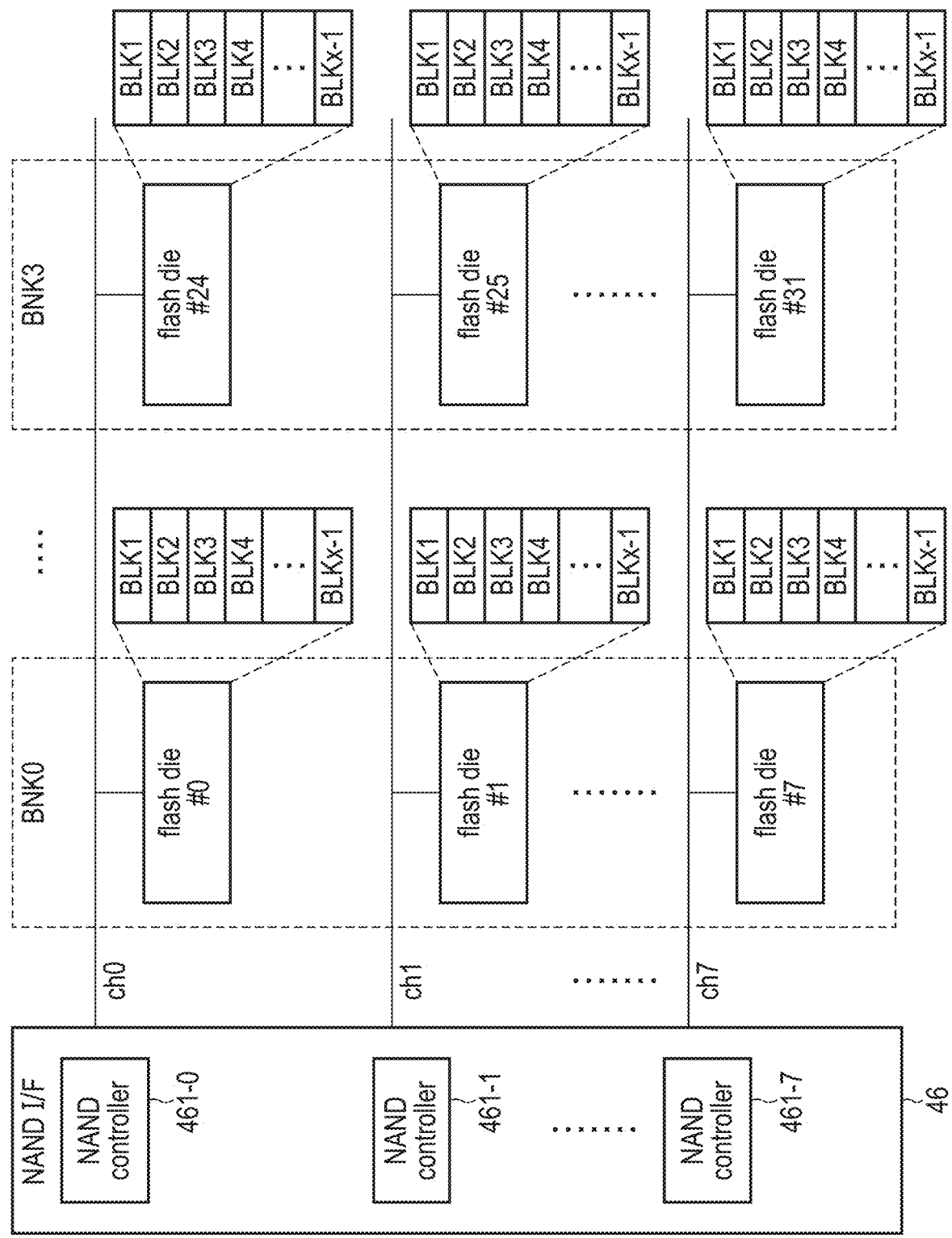
F I G. 2

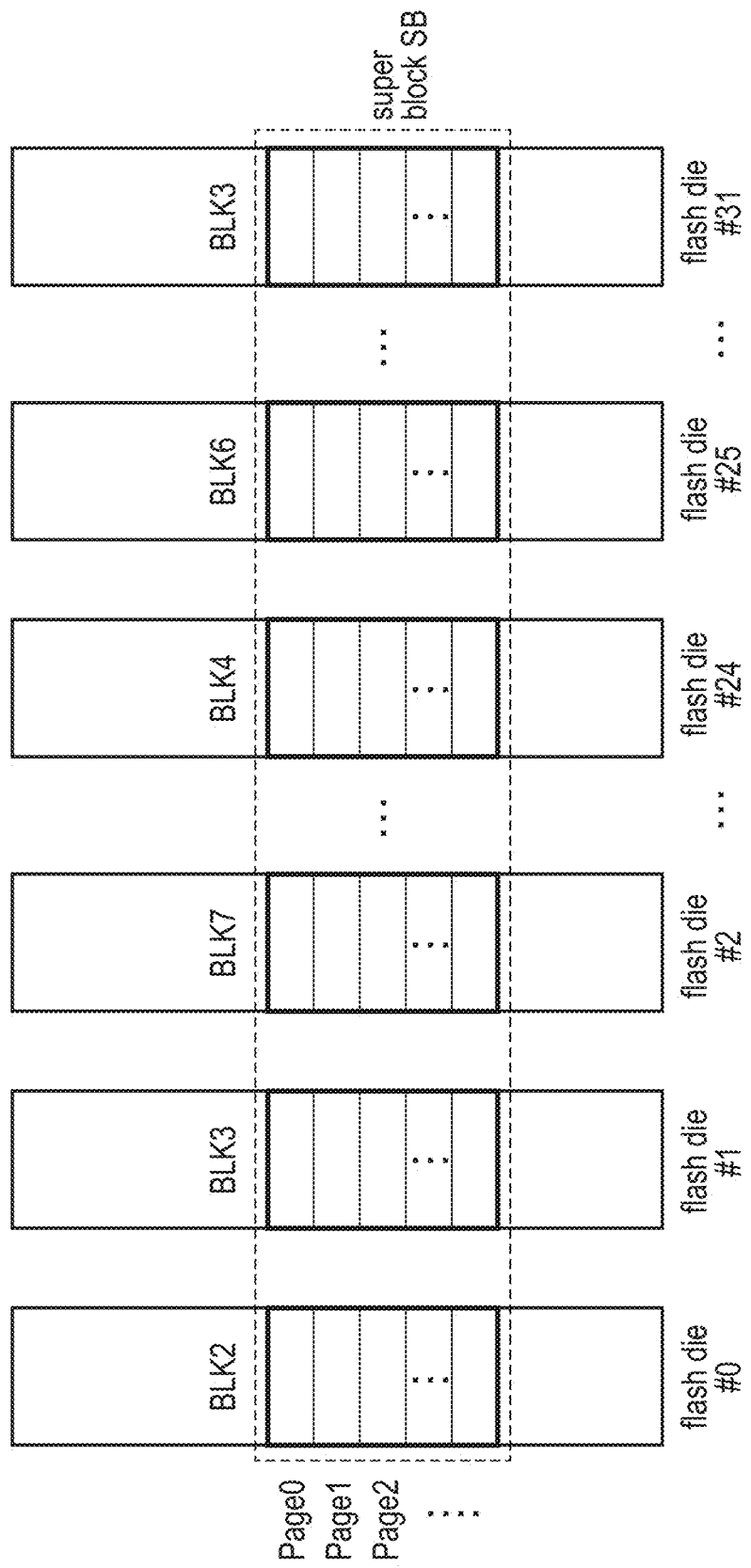
F I G. 3

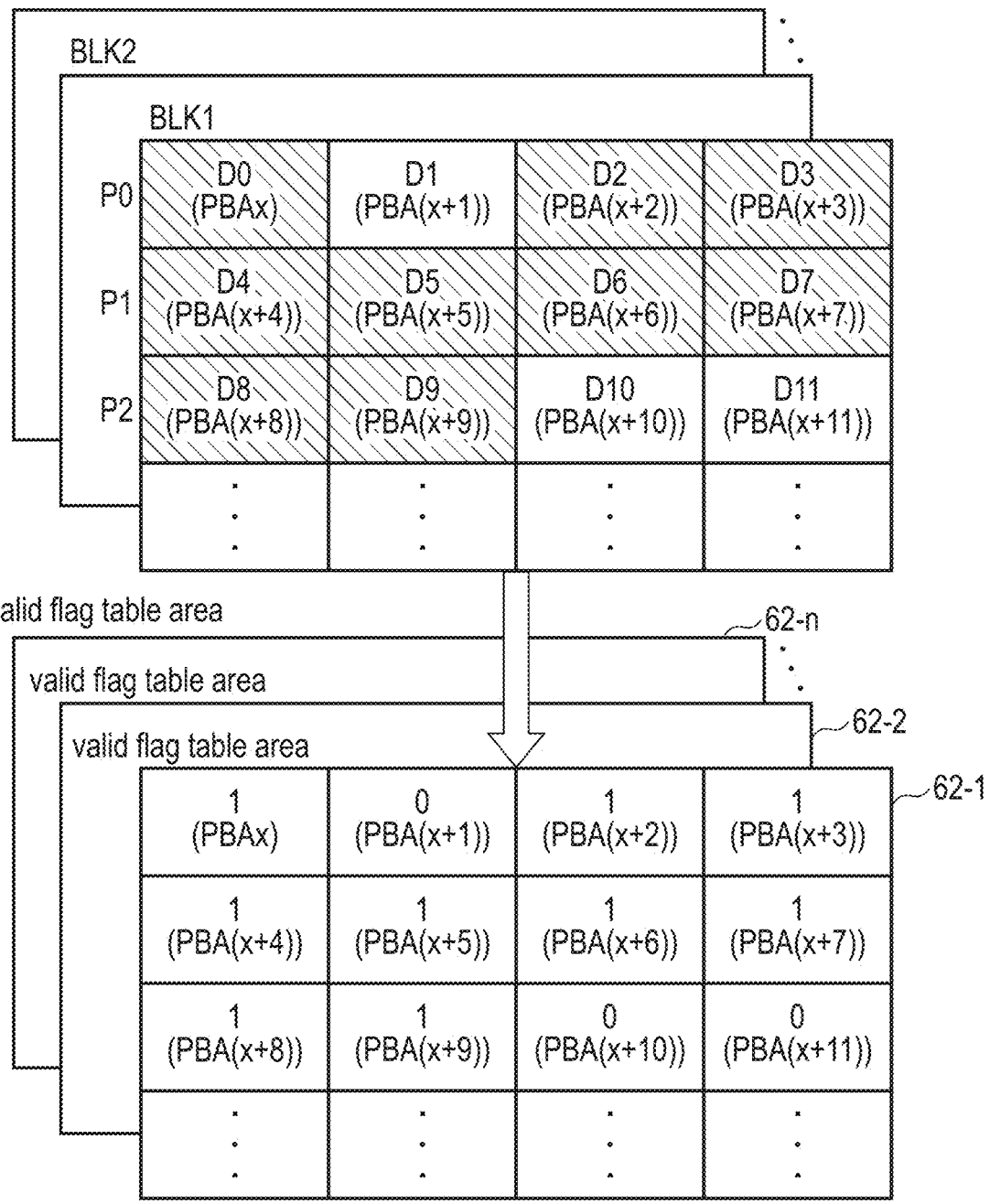
F I G. 4

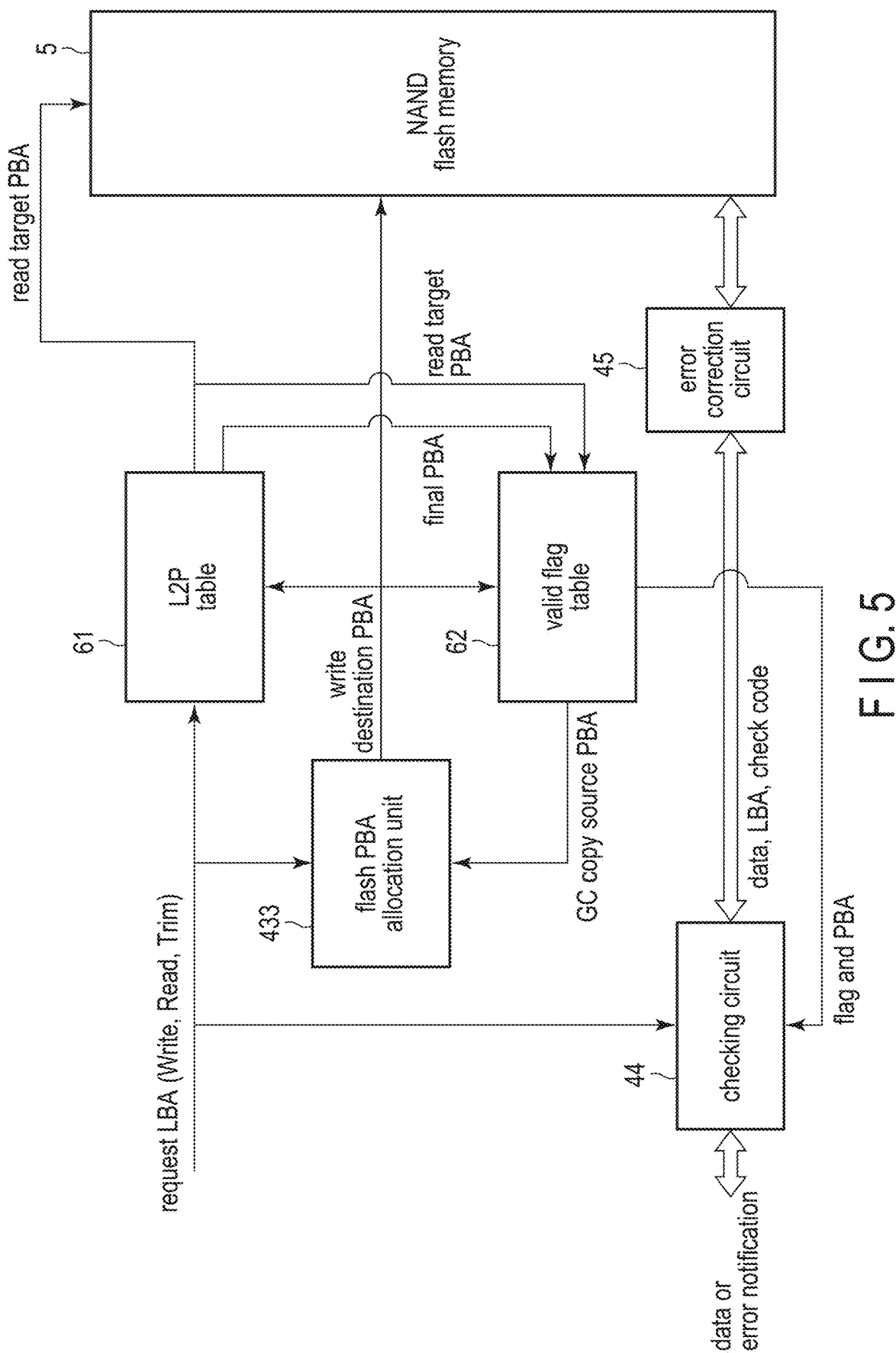
F I G. 5

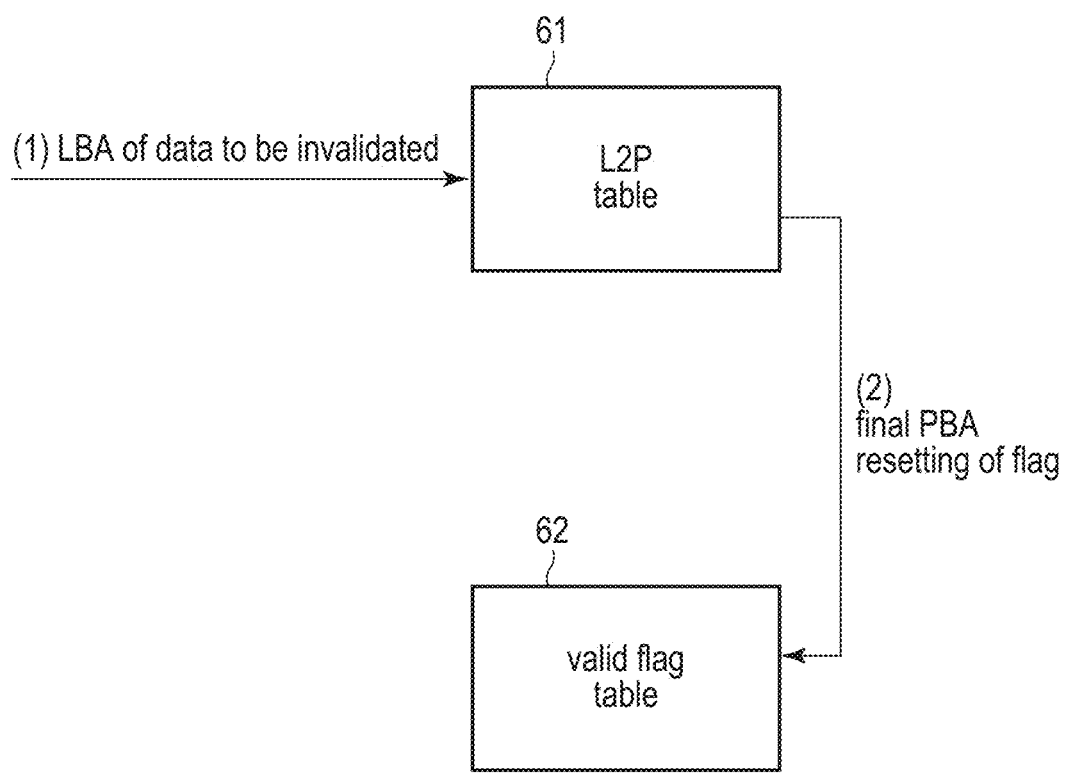
F I G. 7

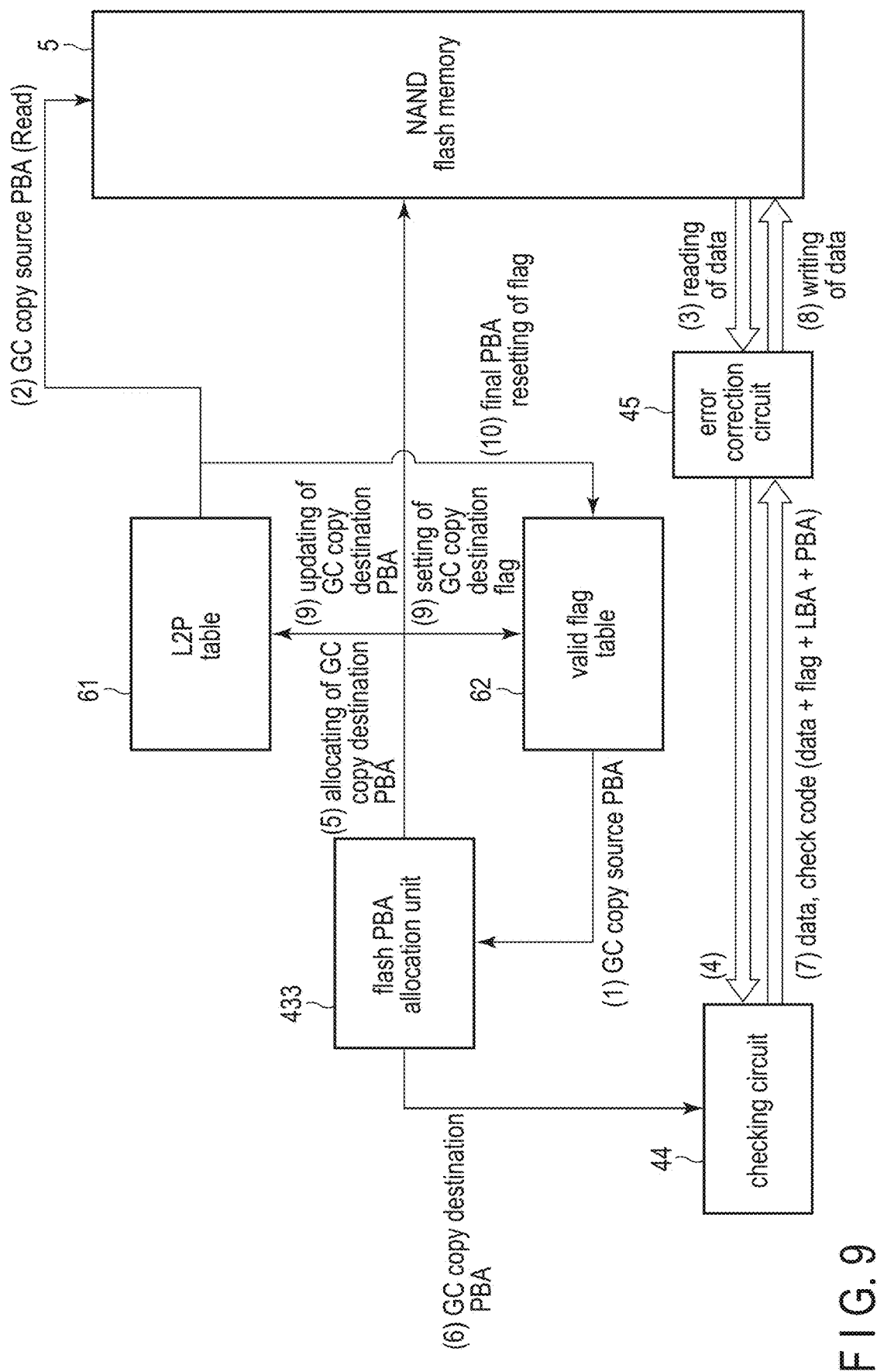
F I G. 9

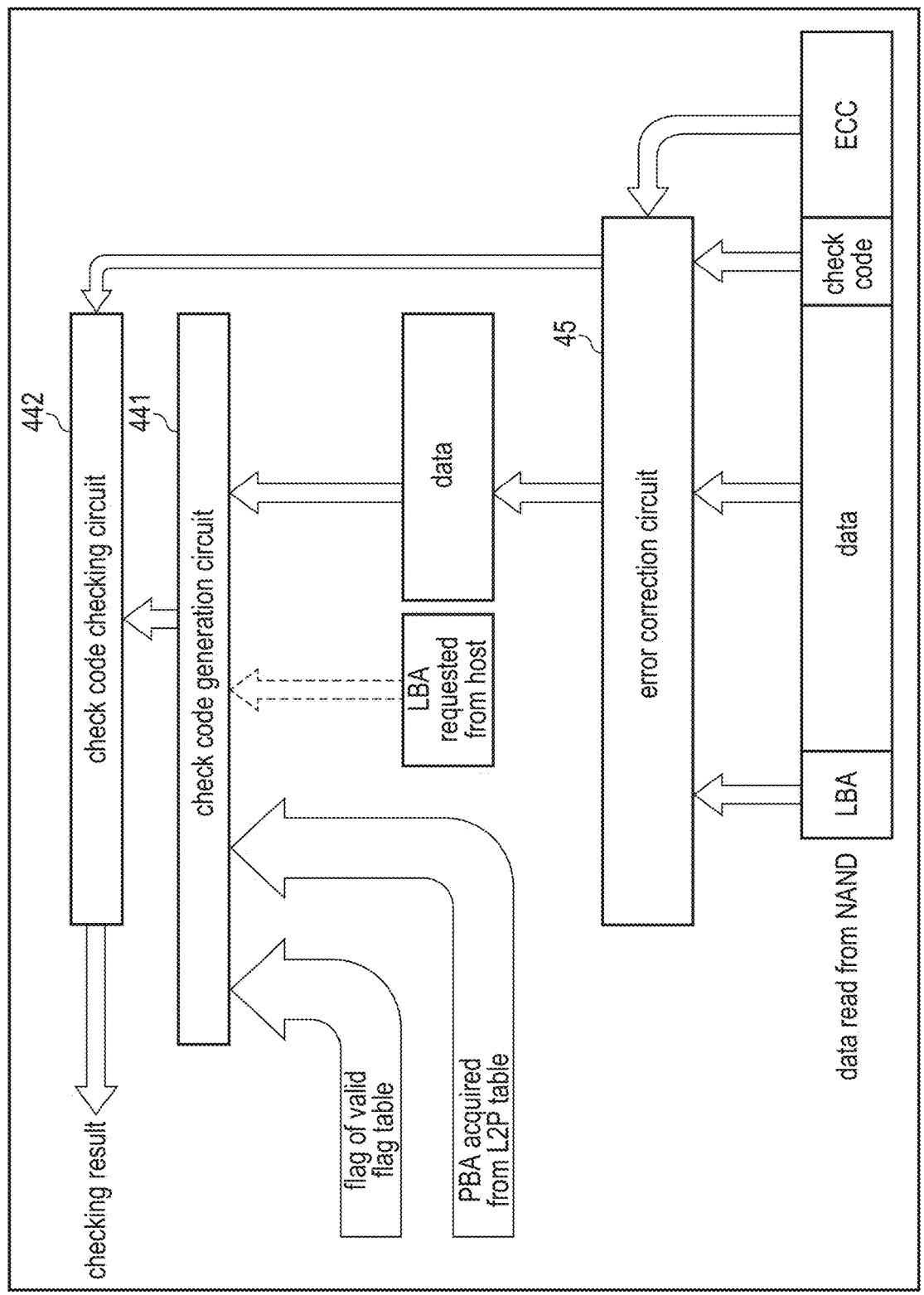
F I G. 15

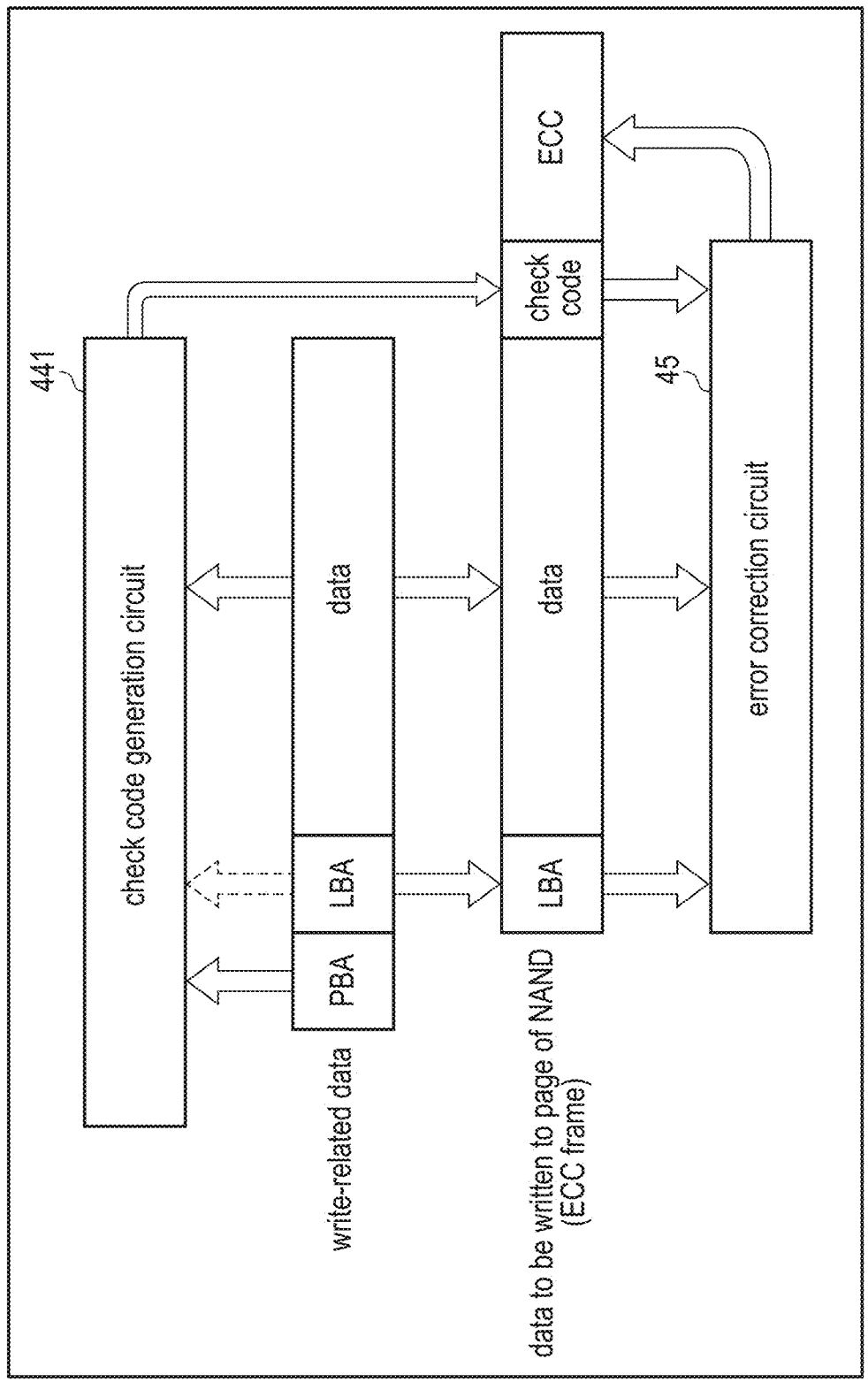
F I G. 18

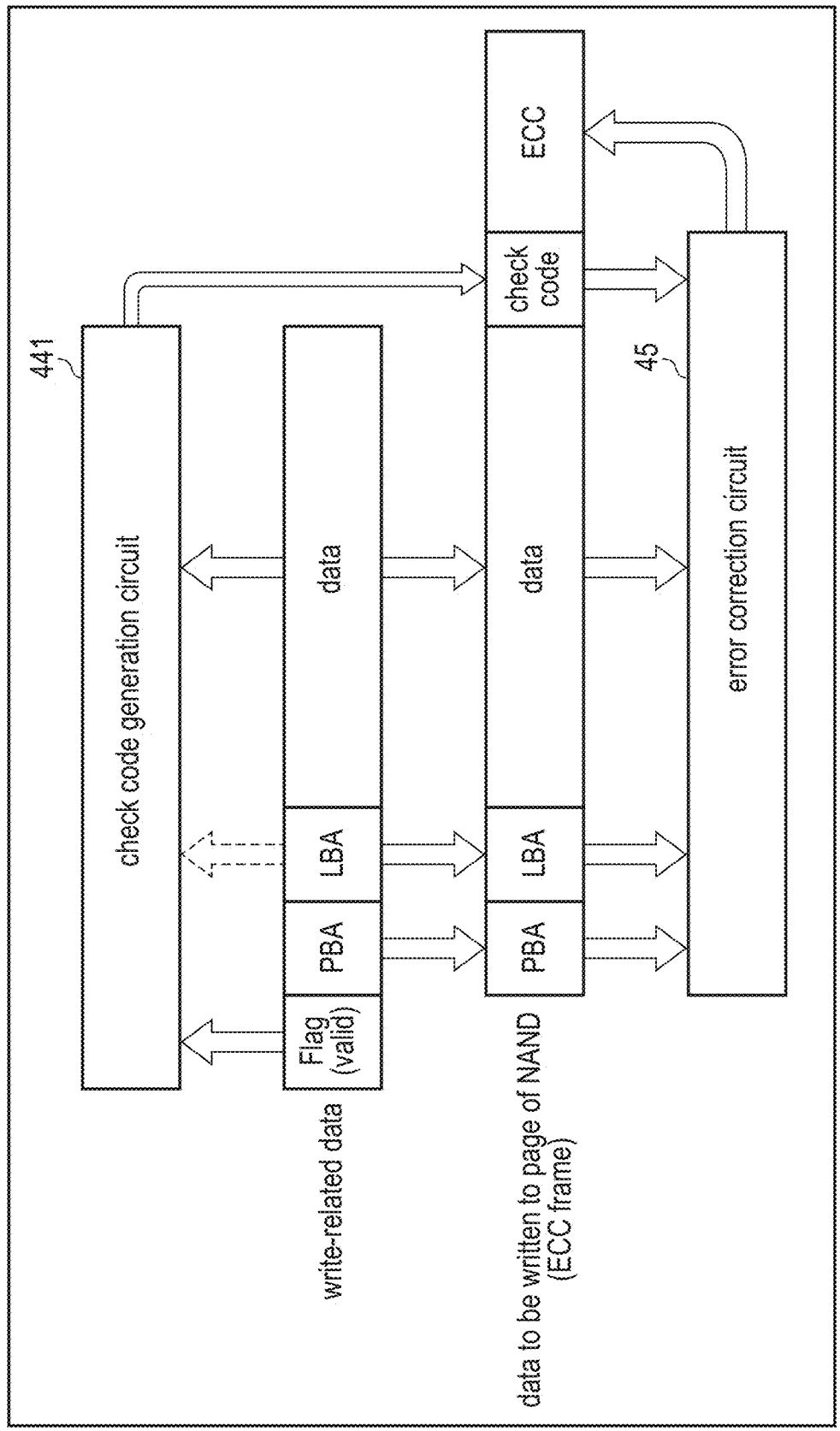
F I G. 22

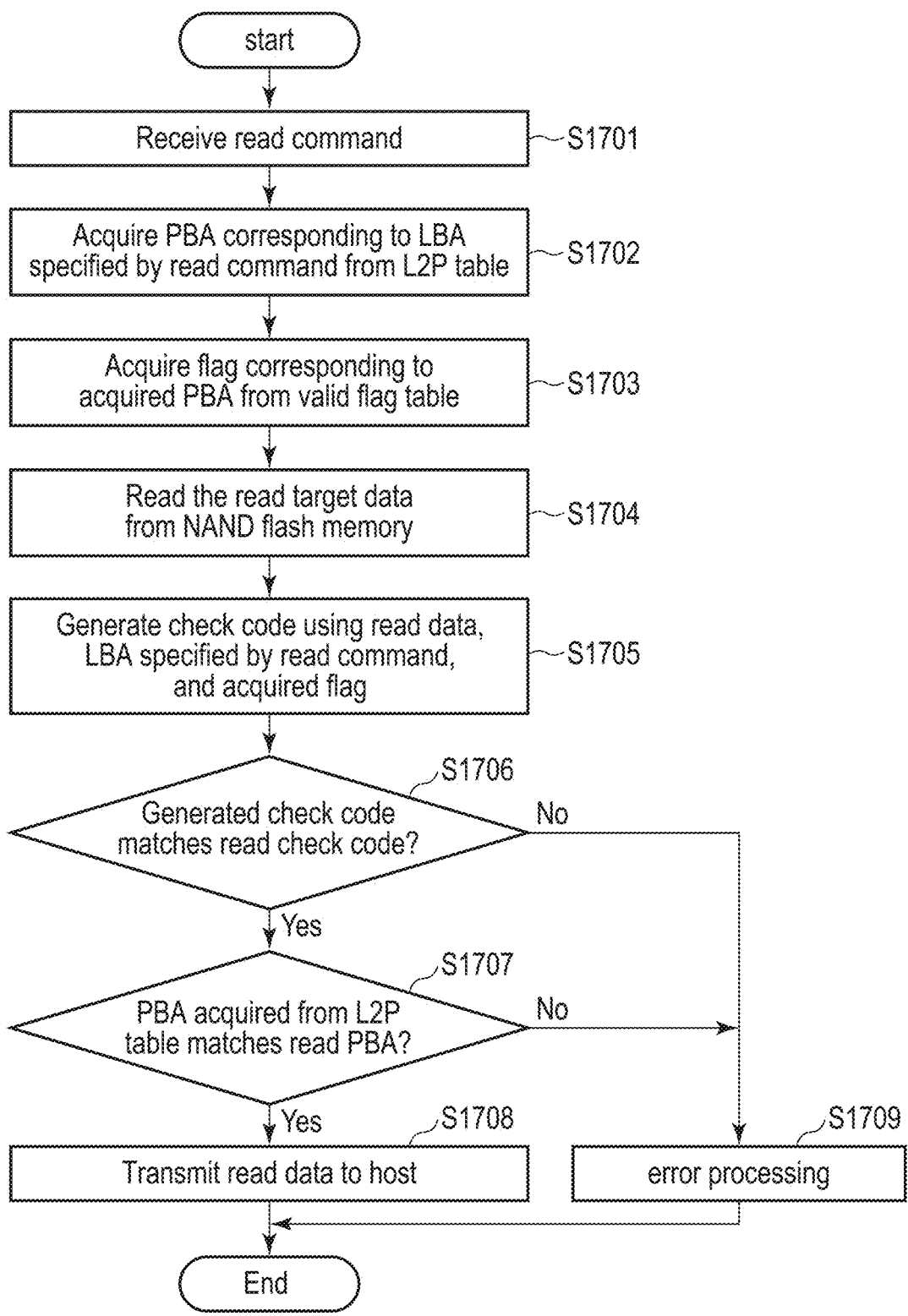
F I G. 25

MEMORY SYSTEM AND METHOD OF CONTROLLING THE MEMORY SYSTEM

CROSS-REFERENCE TO RELATED APPLICATIONS

This application is based upon and claims the benefit of priority from Japanese Patent Application No. 2023-114619, filed Jul. 12, 2023, the entire contents of which are incorporated herein by reference.

FIELD

Embodiments described herein relate generally to a memory system and a method of controlling the memory system.

BACKGROUND

As memory systems have recently become widespread, for example, a solid state drive (SSD) that includes a nonvolatile memory and a controller to control this nonvolatile memory is known.

The memory systems are usually connected to an external host and can transmit and receive data to and from each other. For example, in the SSD, the controller receives a specific command from an external host, and in response, executes a process for writing data received from the host to the nonvolatile memory, and a process for reading data written to the nonvolatile memory and transmitting the data to the host.

In data transmission/reception in memory systems such as SSDs, there is a need for technology that can prevent wrong data from being transmitted to the host due to erroneous reads when reading data written to the nonvolatile memory and transmitting it to the host.

BRIEF DESCRIPTION OF THE DRAWINGS

FIG. 2 is a block diagram illustrating an example of a configuration showing a relationship between a plurality of channels and a plurality of flash memory dies used in the memory system according to the embodiment.

FIG. 3 is a diagram illustrating an example of a configuration of a super block used in the memory system according to the embodiment.

FIG. 4 is a diagram illustrating an example of a configuration of a valid flag table used in the memory system according to the embodiment.

FIG. 5 is a diagram illustrating an example of a configuration relating to control of write data and read data in the memory system according to the embodiment

FIG. 7 is a diagram illustrating a flow of an invalidation process of the memory system according to the embodiment.

FIG. 9 is a diagram illustrating a flow of a garbage collection process of the memory system according to the embodiment.

FIG. 15 is a diagram illustrating a second example of read data of the memory system according to the embodiment.

FIG. 18 is a diagram illustrating a third example of write data of the memory system according to the embodiment.

FIG. 22 is a diagram illustrating a fourth example of write data of the memory system according to the embodiment.

FIG. 25 is a diagram illustrating the fourth example of a procedure of the read process of the memory system of the embodiment.

DETAILED DESCRIPTION

Various embodiments will be described hereinafter with reference to the accompanying drawings.

In general, according to one embodiment, a memory system is connectable to a host. The memory system comprises a nonvolatile memory and a controller configured to control the nonvolatile memory. The controller manages mapping information using a first management table. The mapping information indicates a mapping between a plurality of logical addresses used by the host to access the memory system and a plurality of physical addresses of the nonvolatile memory. The controller manage a plurality of flags using a second management table. The plurality of flags are respectively associated with the plurality of physical addresses. Each of the plurality of flags is set to either a first value or a second value. The first value indicates that data stored in a storage location of the nonvolatile memory corresponding to an associated physical address is valid data. The second value indicates that data stored in the storage location of the nonvolatile memory corresponding to the associated physical address is invalid data. In response to receiving a write command specifying a first logical address from the host, the controller allocates a first physical address to the first logical address, writes first data associated with the write command to a first storage location of the nonvolatile memory corresponding to the first physical address, and sets a first flag corresponding to the first physical address to the first value. In response to that the first data is made invalid data by updating or deleting of the first data, the controller sets the first flag to the second value. In response to receiving a read command specifying the first logical address from the host, the controller acquires from the first management table a physical address that has been mapped to the first logical address at a time of execution of the read command, reads data from the nonvolatile memory based on the acquired physical address, and determines whether or not to transmit the read data to the host, based on whether a current state of a flag corresponding to the acquired physical address is set to the first value or the second value.

Figure 1:
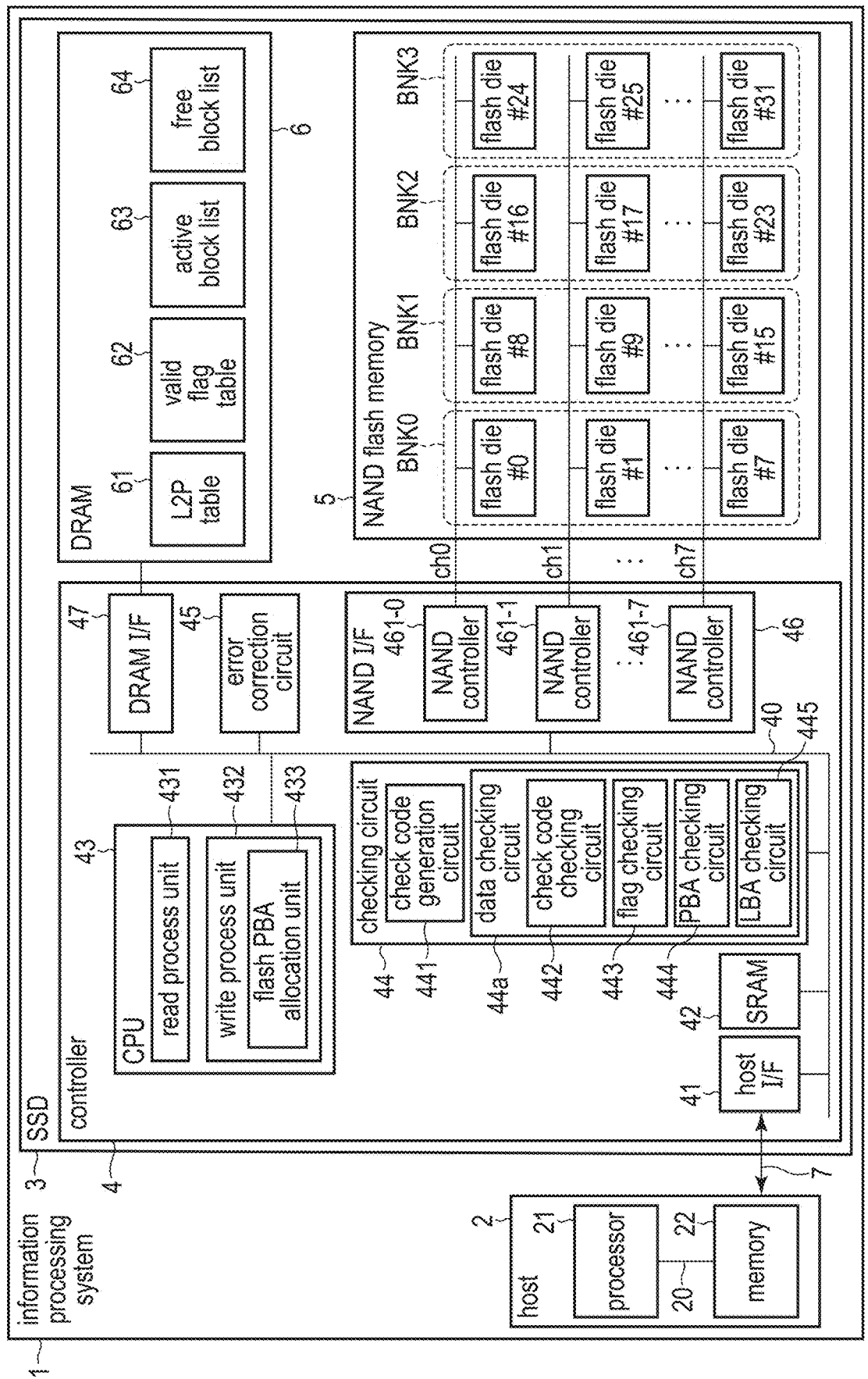
FIG. 1 is a block diagram illustrating an example of a configuration of an information processing system including a memory system according to an embodiment.

FIG. 1 is a block diagram illustrating an example of a configuration of an information processing system 1 including a memory system according to the embodiment. The information processing system 1 includes a host (host device) 2; and a solid state drive (SSD) 3 as the memory system.

The host 2 is, for example, an information processing apparatus such as a personal computer, a server computer, or a mobile device. The host 2 is connectable to the SSD 3 and is accessible thereto. More specifically, the host 2 issues a write command, which is a command for writing data, to the SSD 3. Further, the host 2 issues a read command, which is a command for reading data, to the SSD 3.

The SSD 3 may as well be referred to as a storage device and can write data to and read data from an internal nonvolatile memory.

Communication between the SSD 3 and the host 2 is performed via a bus 7. The bus 7 is a transmission path which connects the host 2 and the SSD 3 to each other. The bus 7 is, for example, a PCI Express™ (PCIe™) bus. The PCIe bus is a full duplex transmission path. The full duplex transmission path includes both a transmission path for transmitting data and input/output (I/O) commands from the host 2 to the SSD 3 and a transmission path for transmitting data and responses from the SSD 3 to the host 2. The I/O commands are issued from the host 2 to the SSD 3 and include write commands for writing data to the nonvolatile memory or read commands for reading data from the nonvolatile memory.

For example, the NVM Express™ (NVMe™) standard may be used as a logical interface standard for connecting the host 2 and the SSD 3. In the interface conforming to the NVMe™ standard, a pair of queues including at least one submission queue (SQ), and a completion queue (CQ) associated with the at least one submission queue (SQ) are used to perform communication between the host 2 and the SSD 3. This pair of queues is referred to as a submission queue/completion queue pair (SQ/CQ pair).

Next, the configuration of the host 2 will be described.

The host 2 includes a processor 21 and a memory 22, and the processor 21 and the memory 22 are interconnected to each other via an internal bus 20.

The processor 21 is, for example, a central processing unit (CPU). The processor 21 executes software (host software) loaded into the memory 22 from the SSD 3 or some other storage device connected to the host 2. The host software includes, for example, an operating system, a file system, and an application program.

The memory 22 is, for example, a volatile memory. The memory 22 may as well be referred to as a main memory, system memory, or host memory. The memory 22 is, for example, a dynamic random access memory (DRAM). A part of a memory area of the memory 22 is used as a host write buffer 221. The host write buffer 221 is a memory area that temporarily stores data to be written to the nonvolatile memory of the SSD 3. Further, another part of the memory area of the memory 22 is used as a host read buffer. The host read buffer is a memory area that temporarily stores data that is read from the nonvolatile memory of the SSD 3 and is transmitted (transferred) to the host.

Next, an internal configuration of the SSD 3 will be described. Here, it is assumed that the nonvolatile memory included in the SSD 3 is a NAND flash memory, but it may as well be other flash memory or other nonvolatile memory such as MRAM, ReRAM, FeRAM, phase-change memory or the like.

The SSD 3 includes a controller 4 and a NAND flash memory 5. The NAND flash memory 5 may be a flash memory of a two-dimensional structure or a three-dimensional structure. Further, the SSD 3 may further include a random access memory, for example, a dynamic random access memory (DRAM) 6, which is a volatile memory.

The controller 4 is a memory controller. The controller 4 is control circuitry such as a system-on-a-chip (SoC). The controller 4 is electrically connected to each of the NAND flash memory 5 and the DRAM 6. The controller 4 processes various commands received from the host 2. When the controller 4 receives a write command, the controller 4 executes a process of writing data to the NAND flash memory 5. When the controller 4 receives a read command, the controller 4 executes a process of reading data from the NAND flash memory 5. Further, when the controller 4 receives a trim command, the controller 4 executes a process of invalidating data stored in the NAND flash memory 5. The trim command, which may as well be referred to as a deallocate command or unmap command, is a command that requests the SSD 3 to invalidate data. The invalidated data is referred to as invalid data, which will not be accessed by the host 2. On the other hand, data that may be accessed by the host 2 before being invalidated is referred to as valid data.

For the physical interface connecting the controller 4 and the NAND flash memory 5 to each other, for example, a Toggle interface or an open NAND flash interface (ONFI) is used. The function of each part of the controller 4 can be realized by dedicated hardware, a processor which executes a program, or a combination of the dedicated hardware and the processor.

The NAND flash memory 5 may include a plurality of dies. The dies each may as well be referred to as a flash die, a memory die, a memory chip, flash chip or the like. In the following descriptions, the dies will be referred to as flash dies. FIG. 1 shows an example the NAND flash memory 5 includes thirty two flash dies #0 to #31.

Each of the flash dies included in the NAND flash memory 5 is constituted by a plurality of blocks. Each of the plurality of blocks is a smallest unit for a data erase operation. Each of the blocks may as well be referred to as a memory block or a physical block. Each of the blocks includes a plurality of pages. Each of the pages is a unit for each of a data write operation and a data read operation. Each of the pages includes a set of memory cells connected to the same word line. Each of the pages may as well be referred to as a physical page.

The DRAM 6 is a volatile memory. A part of a memory area of the DRAM 6 is, for example, used by the controller 4 to temporarily store data to be written to the NAND flash memory 5 or to temporarily store data read from the NAND flash memory 5.

Next, an internal configuration of the controller 4 will be described. The controller 4 includes, for example, a host interface (host I/F) 41, a static RAM (SRAM) 42, a CPU 43, a checking circuit 44, an error correction circuit 45, a NAND interface (NAND I/F) 46, a DRAM interface (DRAM I/F) 47 and the like, as the components of the controller 4. These components are interconnected to each other via an internal bus 40.

The host interface 41 is a communication interface circuit which executes communication with the host 2. The host interface 41 is realized, for example, by a PCIe controller.

The SRAM 42 is a volatile memory. A memory area of the SRAM 42 is used, for example, as a work area of the CPU 43. Another memory area of the SRAM 42 may be used as a memory area for temporarily store data to be written to the NAND flash memory 5.

The CPU 43 is a processor. The CPU 43 loads a control program (firmware) stored in the NAND flash memory 5 or a ROM (not shown) into the SRAM 42. Then, the CPU 43 performs various processes by executing this firmware. Note that the firmware may be loaded on the DRAM 6.

The CPU 43 performs, for example, management of data stored in the NAND flash memory 5 and management of the blocks included in the NAND flash memory 5 as a flash translation layer (FTL). The management of the data stored in the NAND flash memory 5 includes management of mapping information using a logical-to-physical address translation table (L2P table) 61. The L2P table 61 is a table that holds the mapping information. The mapping information is information that indicates mapping between each of a plurality of logical addresses and each of a plurality of physical addresses. Details of the mapping information will be described later.

Among the data stored in the NAND flash memory 5, data stored in a storage location indicated by a physical address mapped to a logical address is valid data. On the other hand, data stored in a storage location indicated by a physical address which is not mapped to any logical address is invalid data. In other words, even when data is stored at a storage location corresponding to a physical address, it is invalid data unless the physical address is not mapped with a logical address. The CPU 43 manages a block that holds at least one valid data as an active blocks. On the other hand, the CPU 43 manages a block that does not hold any valid data as a free block.

Further, management of each block of the NAND flash memory 5 includes management of defective blocks (bad blocks), wear leveling (WL), garbage collection (GC) and the like.

The checking circuit 44 is a circuit which checks whether data read from the NAND flash memory 5 (read data) is correct data or not. In the checking circuit 44, for example, a check code may be used to check whether the read data is correct data or not, that is, to check integrity of the read data. The checking circuit 44 includes, for example, a check code generation circuit 441, a check code checking circuit 442, a flag checking circuit 443, a PBA checking circuit 444, and a LBA checking circuit 445. Some or all of the check code checking circuit 442, the flag checking circuit 443, the PBA checking circuit 444, and the LBA checking circuit 445 may operate as a data checking circuit 44a.

The check code generation circuit 441 generates a check code, for example, using the data to be written to the NAND flash memory 5. The check code is a code for checking whether or not this data is correct data, that is, a code for checking integrity of this data. The check code is, for example, a cyclic redundancy code (CRC) or a hash value.

The check code generation circuit 441 generates check codes using at least user data. The user data is data associated with a write command received from the host 2. For example, two check codes generated respectively from two identical data will have values that match each other. On the other hand, two check codes generated respectively from two different data will have values different from each other. Therefore, the two data used to generate the two check codes of a matching value are determined to be the same data as each other. Further, the two data used to generate the check codes of two different values are determined to be data different from each other.

In this manner, the check code generation circuit 441 generates the check code for checking the integrity of user data. For example, when writing data, this user data and the check code generated from this user data are written as a single data set to a write destination storage location in the NAND flash memory 5. Further, for example, when reading data, the check code generation circuit 441 generates a check code to be compared with the check code which is read together with the user data from a read target storage location in the NAND flash memory 5.

Note that the check code generation circuit 441 may generate a check code using not only the user data but also a logical address (for example, a logical block address (LBA)), a physical address (for example, a physical block address (PBA)), or a flag. That is, the check code generation circuit 441 may generate a check code for checking the integrity of information including, for example, all of the LBA, PBA, and flag, and the user data, using all of the LBA, PBA, and flag, and the user data. Alternatively, the check code generation circuit 441 may generate a check code for checking the integrity of information including, for example, any combination of the LBA, PBA, and flag, and the user data, using this arbitrary combination of the LBA, PBA, and flag, and the user data. Here, the flag is 1-bit information indicative of whether data stored in one storage location in the NAND flash memory 5 indicated by a certain physical address is valid data or invalid data. When the data is valid data, the value of the flag is set to a first value, and when the data is invalid data, the value of the flag is set to a second value.

The data checking circuit 44a determines whether or not the read data which is read from the NAND flash memory 5 matches data of the check code generated by the check code generation circuit 441. Here, the data is data of the check code generated by using (1) the user data and/or (2) any combination of LBA, PBA, and flag, in the check code generation circuit 441. If both data match each other, both data are determined to be identical data. When both data do not match each other, it is determined that both data are not identical data.

The data checking circuit 44a may include, for example, all or some of the check code checking circuit 442, the flag checking circuit 443, the PBA checking circuit 444, and the LBA checking circuit 445.

The operations of the check code checking circuit 442, check unit 443, 444, and 445, which can be provided in the data checking circuit 44a, will now be described.

The check code checking circuit 442 is a circuit that checks whether or not two check codes match each other. The check code checking circuit 442 compares a check code of the data read from the NAND flash memory 5 with a check code generated by the check code generation circuit 441. When these two check codes match each other, the check code checking circuit 442 determines that the data read from the NAND flash memory 5 is identical data, that is, correct data. When the two check codes do not match each other, the check code checking circuit 442 determines that the data read from the NAND flash memory 5 is not identical data, that is, that the data read from the NAND flash memory 5 is wrong data.

The flag checking circuit 443 is a circuit that determines whether or not a current state of a flag corresponding to a physical address that is mapped to a read target logical address at the time of execution of the read is set to the first value. In other words, the flag checking circuit 443 refers to a value of a flag corresponding to a physical address that is mapped to a logical address specified by the read command received from the host 2 at the time of execution of the read, and determines whether or not the value of this flag continues to be maintained at the first value. When the value of the flag is the first value, the flag checking circuit 443 determines that the user data read from the NAND flash memory 5 is the correct data. On the other hand, when the value of the flag is not maintained at the first value, the flag checking circuit 443 determines that the user data read from the NAND flash memory 5 is wrong data.

The PBA checking circuit 444 is a circuit that checks whether or not two physical addresses (PBA) match each other. The PBA checking circuit 444 checks, for example, whether or not a PBA read from the NAND flash memory 5 matches the latest PBA that is mapped to the LBA specified by the read command at the time of execution of the read. When these two PBAs match each other, the PBA checking circuit 444 determines that the data read from the NAND flash memory 5 is the correct data. When these two PBAs do not match each other, the PBA checking circuit 444 determines that the data read from the NAND flash memory 5 is wrong data.

The LBA checking circuit 445 is a circuit that checks whether or not two logical addresses (LBAs) match each other. The LBA checking circuit 445 checks, for example, whether or not the latest LBA specified by the read command matches a LBA read together with read data from the NAND flash memory 5. When these two LBAs match each other, the LBA checking circuit 445 determines that the data read from the NAND flash memory 5 is the correct data. On the other hand, when these two LBAs do not match each other, the LBA checking circuit 445 determines that the data read from the NAND flash memory 5 is wrong data.

In the read process executed in this embodiment, when the read data is previous data corresponding to a logical address specified by the read command received from the host 2, (that is, old data), the read data is detected as wrong data by the checking circuit 44. That is, even in the case where the read data is data corresponding to the same logical address as that specified by the read command, if this read data is not the latest data (new data) corresponding to this logical address, but the previous data (old data), this read data is detected as wrong data.

In the NAND flash memory 5, when the data corresponding to a certain logical address is updated, the updated data (new data) is written to another storage location different from the certain storage location where the previous data (old data) is stored. As a result, in the NAND flash memory 5, data of multiple generations, which correspond to the same logical address may exist. Therefore, if an error occurs in part of the mapping information due to data corruption or the like in the L2P table 61, the previous data (old data) corresponding to a certain logical address may be erroneously read from the NAND flash memory 5.

However, according to this embodiment, when the previous data (old data) corresponding to a certain logical address is invalidated by the writing of updated data (new data) corresponding to this logical address, the flag corresponding to the physical address indicative of the storage location where the previous data (old data) is stored is set to the second value, which indicates invalid data. The controller 4 acquires from the L2P table 61 a latest physical address that has been mapped to a logical address (read target logical address) specified by a read command received from the host 2 at the time of execution of the read command, and reads data from the NAND flash memory 5 based on the thus acquired physical address. When reading data, it is determined whether or not the current state of the flag corresponding to the acquired latest physical address continues to be maintained in the state in which it is set at the first value. With this operation, it is possible to determine whether the data read from the NAND flash memory 5 is the correct data or wrong data. Based on the result of this determination, the controller 4 determines whether or not to transmit the data read from the NAND flash memory 5 to the host 2. In this manner, it is possible to prevent wrong data, such as previous data (old data) corresponding to a read target logical address or data already invalidated by a trim command, from being transmitted to the host 2 due to erroneous read.

There are two methods for determining whether or not the current state of the flag corresponding to the physical address that has been mapped to the read target logical address at the time of execution of the read is continuously maintained to the state where it is set to the first value, which are the first method and the second method to described below.

The first method is a method in which with reference to the flag itself corresponding to the physical address that has been mapped to the read target logical address at time of execution of the read, it is determined by the flag checking circuit 443 whether or not the value of this flag continues to be maintained at the first value (a logical-to-physical map flag value determination method ("I/O"). This method may as well be referred to simply as the flag value determination method, hereafter.

The second method is a method in which the integrity of information including the user data and the flag having the first value is checked using a check code which is written together with the user data at a time of writing to the NAND flash memory 5 (check code determination method ("match/mismatch")).

According to the second method, when reading user data from the storage location indicated by the physical address that has been mapped to the read target logical address at the time of execution of the read command, a check code is also read together with the user data. Then, a new check code for checking integrity of information that includes a flag and the read user data is generated using this flag and the read user data. This flag is a flag corresponding to a physical address that has been mapped to the read target logical address at time of execution of the read. When the value of this flag is set to the second value, the new check code does not match the read check code. Therefore, by determining whether or not the new check code matches the read check code it is possible to determine whether or not the current state of the flag corresponding to the physical address that has been mapped to the read target logical address at the time of execution of the read continues to be maintained at the first value. Therefore, the value of the flag need not be determined by referring to the flag itself by the flag checking circuit 443. In other words, in the second method, the checking circuit 44 need not include the flag checking circuit 443.

As described above, the physical address of the storage location where the previous data (old data) corresponding to a certain logical address is stored and the physical address of the storage location where the latest data (new data) corresponding to this logical address is stored are different from each other. Note here that even in the case where the content of the mapping information in the L2P table 61 is correct, when a malfunction of the address decoder or the like in the NAND flash memory 5 occurs, data may be erroneously read from the storage location where the previous data (old data) corresponding to this logical address is stored. In this case as well, wrong data may be transmitted to the host 2 due to the erroneous read.

In this case of such erroneous read caused by a malfunction occurring in the NAND flash memory 5, it is necessary to prevent wrong data from being transmitted to the host 2. Therefore, the controller 4 may write user data to the NAND flash memory 5 together with additional information determined directly or indirectly from a physical address to which this user data is to be written. As the additional information determined directly or indirectly from the physical address to which the user data is to be written, the physical address itself to which the user data is to be written may be used. Alternatively, a check code generated from information that includes the user data and the physical address may be used as this additional information.

When reading data corresponding to a read target logical address, which is specified by a read command, from the NAND flash memory 5, the controller 4 acquires from the L2P table 61 the latest physical address (the read target physical address) that has been mapped to the read target logical address at the time of execution of the read command. The controller 4 reads the user data and the additional information together from the NAND flash memory 5 based on the acquired read target physical address. The controller 4 determines whether or not the read additional information matches additional information determined directly or indirectly from the read target physical address. In the case where the physical address itself is used as the additional information, the controller 4 determines whether or not the thus read additional information matches the read target physical address. On the other hand, in the case where the check code of the information that includes the user data and the physical address is used as the additional information, the controller 4 first generates a check code using the read user data and the read target physical address. Then, the controller 4 determines whether or not the read additional information matches the generated check code.

As described above, by determining whether or not the read additional information matches the additional information determined directly or indirectly from the read target physical address, it is possible to determine whether or not the user data read from the NAND flash memory 5 is the correct data read from the read target physical address, or wrong data read from another physical address different from the read target physical address. Thus, the controller 4 determines whether or not to transmit the user data read from the NAND flash memory 5 to the host 2, based on whether or not the additional information read from the NAND flash memory 5 matches the additional information determined directly or indirectly from the read target physical address. As a result, wrong data, such as previous data corresponding to the read target logical address, can be prevented from being transmitted to the host 2.

As mentioned above, the direct or indirect additional information may be, for example, the physical address (PBA) itself. In this case, the controller 4 writes the user data to the NAND flash memory 5 together with the PBA to which this user data is to be written (which may as well be referred to as write destination PBA).

Alternatively, as described above, the direct or indirect additional information may be, for example, a check code. In this case, the controller 4 first generates a check code for checking the integrity of the information that includes the user data and the write destination PBA, and then writes the user data together with the thus generated check code to the NAND flash memory 5.

When the additional information is the PBA itself (PBA additional information), the PBA checking circuit 444 compares the two PBAs to determine whether or not the user data read from the NAND flash memory 5 is the correct data. On the other hand, when the additional information is a check code (check code additional information), the check code checking circuit 442 compares the two check codes to determine whether or not the data read from the NAND flash memory 5 is the correct data. Therefore, in this case, the PBA checking circuit 444 need not to compare the PBAs itself, the checking circuit 444 need not contain the PBA checking circuit 444.

The error correction circuit 45 executes an encoding process when data is written to the NAND flash memory 5. In the encoding process, the error correction circuit 45 adds an error correction code (ECC) as a redundancy code to the data to be written to the NAND flash memory 5. When data is read from the NAND flash memory 5, the error correction circuit 45 executes a decoding process. In the decoding process, the error correction circuit 45 executes error correction of the data read from the NAND flash memory 5 by using the ECC added to this read data.

The NAND interface 46 is a circuit that controls the NAND flash memory 5. The NAND interface 46 is electrically connected to a plurality of flash dies contained in the NAND flash memory 5.

Each of the flash dies can operate independently. Therefore, the flash dies function as parallel operable units. The NAND interface 46 includes, for example, NAND controllers 461-0, 461-1, . . . , 461-7. The NAND controllers 461-0, 461-1, . . . , 461-7 are connected to channels ch0, ch1, . . . , ch7, respectively. The NAND controllers 461-0, 461-1, . . . , 461-7 are each connected to one or more flash dies via the corresponding channel. FIG. 1 illustrates an example case in which four flash dies are connected to each of the channels ch0, ch1, . . . , ch7. In this case, the NAND controller 461-0 is connected to flash dies #0, #8, #16 and #24 via the channel ch0. The NAND controller 461-1 is connected to flash dies #1, #9, #17 and #25 via the channel ch1. Further, the NAND controller 461-7 is connected to flash dies #7, #15, #23 and #31 via the channel ch7. The flash dies #0, #1, . . . , and #7 are handled by the controller 4 as a bank BNK0. The flash dies #8, #9, . . . , #15 are handled by the controller 4 as a bank BNK1. The flash dies #16, #17, . . . , #23 are handled by the controller 4 as a bank BNK2. The flash dies #24, #25, . . . , #31 are handled by the controller 4 as a bank BNK3. A bank is a unit by which a plurality of flash dies are operated in parallel by an interleaving operation. Each of flash dies #0 to #31 includes a plurality of blocks BLK1 to BLKx-1, as shown in FIG. 2.

In the configuration of the NAND flash memory 5 illustrated in FIG. 1 and FIG. 2, the controller 4 can access the flash dies #0 to #31 in parallel by means of 8 channels and bank interleaving operation. Therefore, the controller 4 can execute write or read of data up to a maximum of 32 flash dies in parallel.

Note that each of the flash dies #0 to #31 may have a multi-plane configuration which includes a plurality of planes. For example, when each of the flash dies #0 to #31 includes four planes, the controller 4 can execute a write or read of data up to a maximum of 128 planes in parallel.

Each of the plurality of write destination blocks may be a single block (physical block) or a super block containing a set of a plurality of physical blocks that can be operated in parallel.

One super block may include a total of 32 physical blocks selected one by one from the NAND flash memory dies #0 to #31, though the configuration is not limited to this. Note that each of the NAND flash memory dies #0 to #31 may have a multi-plane configuration. For example, in the case where each of the NAND flash memory dies #0 to #31 has a multiplane configuration containing four planes, one super block may contain a total of 128 physical blocks selected one by one from 128 planes corresponding to the NAND flash memory dies #0 to #31.

FIG. 3 illustrates an example of one super block (SB) which contains thirty two physical blocks (here, the physical block BLK2 in the NAND flash memory die #0, the physical block BLK3 in the NAND flash memory die #1, the physical block BLK7 in the NAND flash memory die #2, . . . , the physical block BLK4 in the NAND flash memory die #24, the physical block BLK6 in the NAND flash memory die #25, . . . , the physical block BLK3 in the NAND flash memory die #31).

The super block (SB) contains the same number of super pages as the number of pages contained in each of the 32 physical blocks. For example, Page0 of physical block BLK2 in the NAND flash memory die #0, Page0 of physical block BLK3 in the NAND flash memory die #1, Page0 of physical block BLK7 in the NAND flash memory die #2, . . . , Page0 of physical block BLK4 in the NAND flash memory die #24, Page0 of physical block BLK6 in the NAND flash memory die #25, . . . , Page0 of physical block BLK3 in the NAND flash memory die #31 may be handled by the controller 4 as one super page of 32 super pages in the superblock (SB).

Note that such a configuration that one superblock contains only one physical block may be used, in which case one superblock is equivalent to one physical block.

Let us return to the explanation of FIG. 1. The DRAM interface 47 is a circuit that controls the DRAM 6. The DRAM interface 47 stores data in the DRAM 6. Further, the DRAM interface 47 reads data stored in the DRAM 6.

Next, the configuration of the DRAM 6 will be described.

The DRAM 6 includes a memory area that stores a logical-to-physical address translation table (L2P table) 61. The DRAM 6 further includes a memory area that stores a valid flag table 62, a memory area that stores an active block list 63, and a memory area that stores a free block list 64.

The L2P table 61 is a table which stores mapping information. The mapping information is information which indicates the mapping between each of the logical addresses and each of the physical addresses of the NAND flash memory 5 in units of a predetermined management size. A logical address is an address used by the host 2 to access the SSD 3. For example, a logical block address (LBA) is used as the logical address. The physical address is an address which indicates a storage location in the NAND flash memory 5. The physical address can be expressed, for example, by a flash die address, a block address, a page address, an offset address within a page, and any combination of all or some of these.

The valid flag table 62 is a table that manages a plurality of flags. The plurality of flags respectively correspond to the plurality of physical addresses in the SSD 3 in a one-to-one relationship. Each of the plurality of flags indicates whether the data stored in the storage location indicated by the corresponding physical address is valid data or invalid data. In other word, the controller 4 manages a plurality of flags that are respectively associated with a plurality of physical addresses of the NAND flash memory 5, using the valid flag table 62. Each of the flags is set to either a first value or a second value. The first value indicates that data stored in a storage location of the NAND flash memory 5 corresponding to an associated physical address is valid data. The second value indicates that data stored in the storage location of the NAND flash memory 5 corresponding to the associated physical address is invalid data. For example, a first flag corresponding to a first physical address is set to the first value indicative of valid data in response to the event that data associated with a write command received from the host 2 has been written to a first storage location indicated by the first physical address. Then, in response to the event that the data stored in the first storage location has become invalid data by updating or deleting the data stored in the first storage location, the first flag is set to the second value corresponding to invalid data. Here, the updating of the data stored in the first storage location means that the updated data (new data) corresponding to the logical address of this data has been written to the NAND flash memory 5. Further, the deletion of the data stored in the first storage location means that this data has been invalidated by a trim command.

The active block list 63 is a table that manages a list of active blocks, each of the active blocks being a block that holds at least valid data.

The free block list 64 is a table that manages a list of free blocks, each of the free blocks being a block that holds no valid data.

Next, the functional configuration of the CPU 43 will be described. The CPU 43 includes a read process unit 431 and a write process unit 432 in addition to the components that function as FTL.

Each of the read process unit 431 and the write process unit 432 may be partially or fully realized by the dedicated hardware of the controller 4.

The read process unit 431 executes a read process by processing each of read commands received from the host 2. The read process includes a process of translating a logical address specified by the read command into a physical address by referring to the L2P table 61, a process of reading data from a storage location in the NAND flash memory 5, which is indicated by the physical address, and a process of transferring the read data to the memory 22 of the host 2.

The write process unit 432 executes a write process by processing each of write commands received from the host 2. The write process includes a process of loading (transferring) write data from the memory 22 of the host 2 to the SRAM 42 or DRAM 6, a process of writing the write data, which is loaded into the SRAM 42 or DRAM 6, to a storage location in the NAND flash memory 5, and a process of updating the L2P table 61 to map the physical address, which indicates the storage location where the write data is written, to the logical address specified by the write command.

The write process unit 432 includes a flash PBA allocation unit 433.

The flash PBA allocation unit 433 allocates, to the LBA specified by the write command, a PBA that indicates a storage location in the NAND flash memory 5, where data associated with this write command is to be written. The PBA allocated to the LBA is a PBA that indicates a storage location available for writing updated data (new data).

Next, the valid flag table 62 will be described. FIG. 4 is a diagram illustrating an example of a configuration of the valid flag table 62 used in the memory system according to the embodiment.

The valid flag table 62 includes a plurality of valid flag table areas 62-0, ..., 62-n. Each of the plurality of valid flag table areas 62-1, ..., 62-n corresponds to one block BLK of the plurality of blocks BLK1, ..., BLKn.

For example, the valid flag table area 62-1 corresponds to a block BLK1. The valid flag table area 62-1 includes a plurality of flags. The plurality of flags may as well be referred to as bitmap data. The bitmap data stored in the valid flag table area 62-1 includes the same number of bits (that is, flags) as the number of a plurality of physical addresses (PBAs) respectively indicating the plurality of storage locations included in the block BLK1. Each of the plurality of flags indicates whether or not data stored in a storage location indicated by the physical address corresponding to this flag is valid or not. The flag corresponding to the physical address indicating the storage location where valid data is stored is set to the first value (for example, "1"). The flag corresponding to the physical address indicating the storage location where invalid data is stored is set to the second value (for example, "0"). The following explanation is based on an example case where the first value is "1" and the second value is "0".

Page P0 of block BLK1 contains, for example, four storage locations indicated by four PBAs (PBAx, PBA(x+1), PBA(x+2), and PBA(x+3)), respectively. At these four storage locations, data D0, data D1, data D2, and data D3 are stored, respectively. When each of data D0, data D2, and data D3 is valid data and data D1 is invalid data, the four flags corresponding to the four PBAs (PBAx, PBA(x+1), PBA(x+2), and PBA(x+3)), i.e., 4-bit bitmap data, indicate "1011". Page P1 of block BLK1 contains four storage locations indicated by four PBAs (PBA(x+4), PBA(x+5), PBA(x+6), and PBA(x+7)), respectively. At these four storage locations, data D4, data D5, data D6, and data D7 are stored, respectively. When each of data D4, data D5, data D6, and data D7 is valid data, the four flags corresponding to the four PBAs (PBA(x+4), PBA(x+5), PBA(x+6), and PBA(x+7)), i.e., 4-bit bit map data, indicate "1111".

Page P2 of block BLK1 contains four storage locations indicated by four PBAs (PBA(x+8), PBA(x+9), PBA(x+10), and PBA(x+11)), respectively. At these four storage locations, data D8, data D9, data D10, and data D11 are stored, respectively. When each of data D8 and data D9 is valid data and each of data D10 and data D11 is invalid data, the four flags corresponding to the four PBAs (PBA(x+8), PBA(x+9), PBA(x+10), and PBA(x+11)), i.e., the four-bit bit map data, indicate "1100".

FIG. 5 is diagram illustrating an example of a configuration of the control of write data and read data in the memory system according to the embodiment.

In the operation of writing data to the NAND flash memory 5, the memory system 3 writes data to the storage location indicated by the write destination PBA output from the flash PBA allocation unit 433. This data is data output by the error correction circuit 45, that is, a code word (ECC frame) that contains the data to be written to the NAND flash memory 5 and the ECC. The data to be written to the NAND flash memory 5 includes, for example, user data, a LBA, and a check code. Note that the data to be written to the NAND flash memory 5 may further contain a PBA. The user data is data associated with a write command received from the host 2. The LBA is a write destination LBA to which the user data is to be written, i.e., a LBA specified by the write command (request LBA). The PBA is a write destination PBA output from the flash PBA allocation unit 433 according to the request LBA specified by the write command.

In the operation of reading data from the NAND flash memory 5, the memory system 3 reads data stored in a storage location indicated by a read target PBA recorded in the L2P table 61 (for example, user data, LBA, check code, or ECC). The read data is transmitted to the error correction circuit 45. When the SSD 3 receives a write command from the host 2, the checking circuit 44 generates a check code (for example, CRC) using, for example, the data associated with the write command, the request LBA specified by the write command, the write destination PBA, and the flag having the value indicating the valid data. The checking circuit 44 then outputs the data associated with the write command, the request LBA, and the generated check code (CRC) to the error correction circuit 45.

When the SSD 3 receives a read command from the host 2, the checking circuit 41 generates, a check code in the check code generation circuit 441, by using, for example, the data read from the NAND flash memory 5, the request LBA (read target LBA) specified by the read command, the read target PBA acquired from the L2P table 61, and the flag corresponding to the read target PBA. Here, the read target PBA is a PBA that has been mapped to the read target LBA at the time of execution of the read command. Then, the checking circuit 44 compares the check code generated in the check code generation circuit 441 with the check code read from the NAND flash memory 5. When the result of the comparison indicates that the two check codes match each other, the checking circuit 44 determines that the read data (user data) is the correct data. The read data is transmitted to the host 2 via the host I/F 41. On the other hand, when the result of the comparison indicates that the two check codes do not match each other, the checking circuit 44 determines that the read data read is wrong data. In this case, the error is notified to the host 2 via the host I/F 41.

The error correction circuit 45 executes encoding of data to be written to the NAND flash memory 5 or decoding of read data. Upon receiving the data, LBA, and check code from the checking circuit 44, the error correction circuit 45 generates ECC using the data, the LBA, and the check code. The error correction circuit 45 then outputs the data, the LBA, the check code, and the ECC to the NAND flash memory 5.

Upon receiving data, LBA, check code, and ECC which are read from the NAND flash memory 5, the error correction circuit 45 executes error correction using the ECC. When the error correction is completed, the error correction circuit 45 outputs the data, the LBA, and the check code to the checking circuit 44.

The L2P table 61 manages the mapping between each LBA and each PBA corresponding to each LBA. When the SSD 3 receives a write command or a trim command from the host 2, the controller 4 acquires from the L2P table 61 a PBA corresponding to the request LBA specified by the received command (which may as well be referred to as the final PBA). The final PBA is a PBA that has been mapped to a LBA specified by a write command or trim command at the time of receiving the write command or the trim command. The squired final PBA is output to the valid flag table 62. When the SSD 3 receives a read command from the host 2, the controller 4 acquires, from the L2P Table 61, a PBA (read target PBA) corresponding to the request LBA specified by the received read command. The read target PBA is output to the NAND flash memory 5 and the valid flag table 62. In the write process or GC process, the L2P table 61 is updated so that the write destination PBA output from the flash PBA allocation unit 433 is mapped to the LBA specified by the write command.

The valid flag table 62 manages a plurality of flags corresponding to different PBAs, respectively. When the SSD 3 receives a write command from the host 2, a flag in the valid flag table 62 corresponding to the final PBA recorded in the L2P table 61 is set to the second value. Then, a flag corresponding to the write destination PBA output from the flash PBA allocation unit 433 is set to the first value. Further, when the SSD 3 receives a read command from the host 2, the controller 4 acquires, from the valid flag table 62a, a flag corresponding to the read target PBA recorded in the L2P table 61 and outputs the thus obtained flag to the checking circuit 44. Furthermore, when the SSD 3 executes the GC process, the controller 4 selects PBAs respectively corresponding to the flags set to the first value from a plurality of PBAs of the GC copy source block, and outputs each of the selected PBAs to the flash PBA allocation unit 433 as GC copy source PBAs. The flash PBA allocation unit 433 determines a GC copy destination PBA as the write destination PBA for each of the GC copy source PBAs. When valid data stored in the storage location indicated by the GC copy source PBA is copied to the storage location indicated by the GC copy destination PBA, the flag corresponding to the GC copy source PBA is set to the second value and the flag corresponding to the GC copy destination PBA is set to the first value.

Next, various processes in the configuration example of the memory system shown in FIG. 5 will be described. More specifically, a write process, an invalidation process, a read process, and a garbage collection process of the memory system will be explained in this order using FIGS. 6, 7, 8, and 9, respectively.

Figure 6:
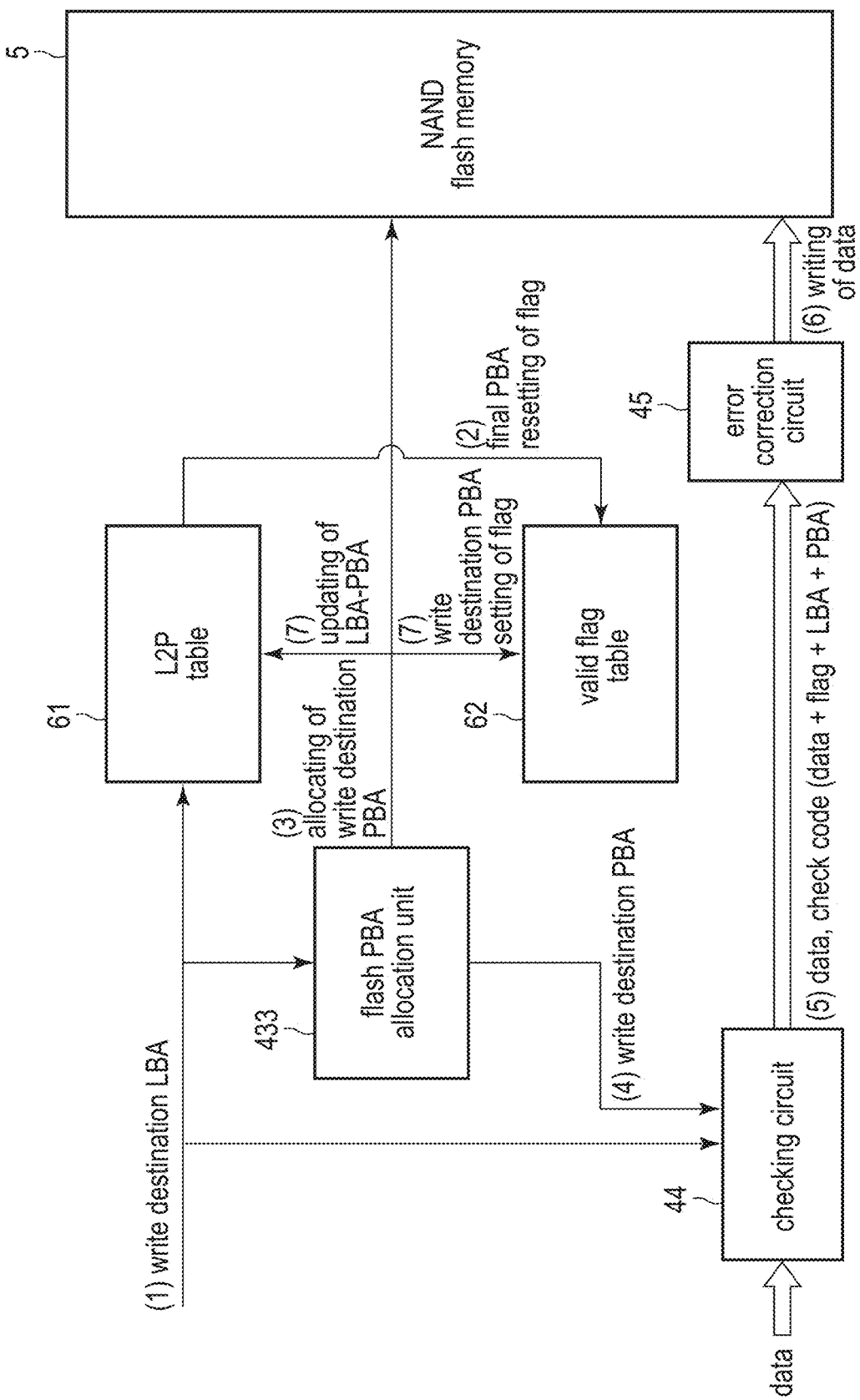
FIG. 6 is a diagram illustrating a flow of a write process of the memory system according to the embodiment.

FIG. 6 is a diagram illustrating a flow of the write process of the memory system. The controller 4 of the SSD 3 starts the write process in response to reception of a write command from the host 2.

Here, as an example, the following explanation is given for a case where check is performed by the second method (check code determination method) and the additional information is a check code (check code additional information).

(1) A write destination LBA specified by a write command received from the host 2 is output to the L2P table 61, the flash PBA allocation unit 433, and the checking circuit 44.

(2) The controller 4 acquires, from the L2P table 61, a PBA that has been mapped to the write destination LBA at the time of execution of the write command, as a final PBA. Then, the controller 4 sets a flag in the valid flag table 62, which corresponds to the final PBA, to the second value ("flag reset" in FIG. 6).

(3) The flash PBA allocation unit 433 of the controller 4 determines a storage location where data associated with the received write command is to be written, and allocates a write destination PBA indicating this storage location to the write destination LBA. The flash PBA allocation unit 433 outputs the write destination PBA to the NAND flash memory 5, the L2P table 61, and the valid flag table 62.

(4) Further, the flash PBA allocation unit 433 outputs the write destination PBA to the checking circuit 44.

(5) The checking circuit 44 generates a check code using the data associated with the received write command, a flag having the first value, the write destination LBA, and the write destination PBA. The flag need not necessarily be a flag corresponding to a specific storage location, but is simply a bit having the first value. The check code generated is, for example, a CRC. The checking circuit 44 outputs the data and the generated check code to the error correction circuit 45.

(6) The error correction circuit 45 generates an error correction code (ECC) using the data and the check code. Then, the error correction circuit 45 outputs the data, the check code, and the ECC to the NAND flash memory 5, as data (ECC frames) to be written to the NAND flash memory 5. The NAND flash memory 5 writes the ECC frame to the storage location indicated by the write destination PBA.

(7) Then, the controller 4 updates the mapping information of the L2P table 61 so that the write destination PBA is mapped to the write destination LBA. Further, the controller 4 sets a flag in the valid flag table 62, which corresponds to the write destination PBA, to the first value ("flag set" in FIG. 6).

FIG. 7 is a diagram illustrating a flow of the invalidation process, focusing on of the configuration example relating to the invalidation process of the memory system. The controller 4 of the SSD 3 starts the invalidation process in response to reception of a trim command from the host 2.

(1) A LBA corresponding to data to be invalidated, which is specified by a trim command received from the host 2, is output to the L2P table 61.

(2) The controller 4 acquires, from the L2P table 61, a PBA that has been mapped to the LBA corresponding to the data to be invalidated at the time of execution of the trim command, as a final PBA. The controller 4 sets a flag in the validated flag table 62, which corresponds to the final PBA, to the second value ("flag reset" in FIG. 6).

Figure 8:
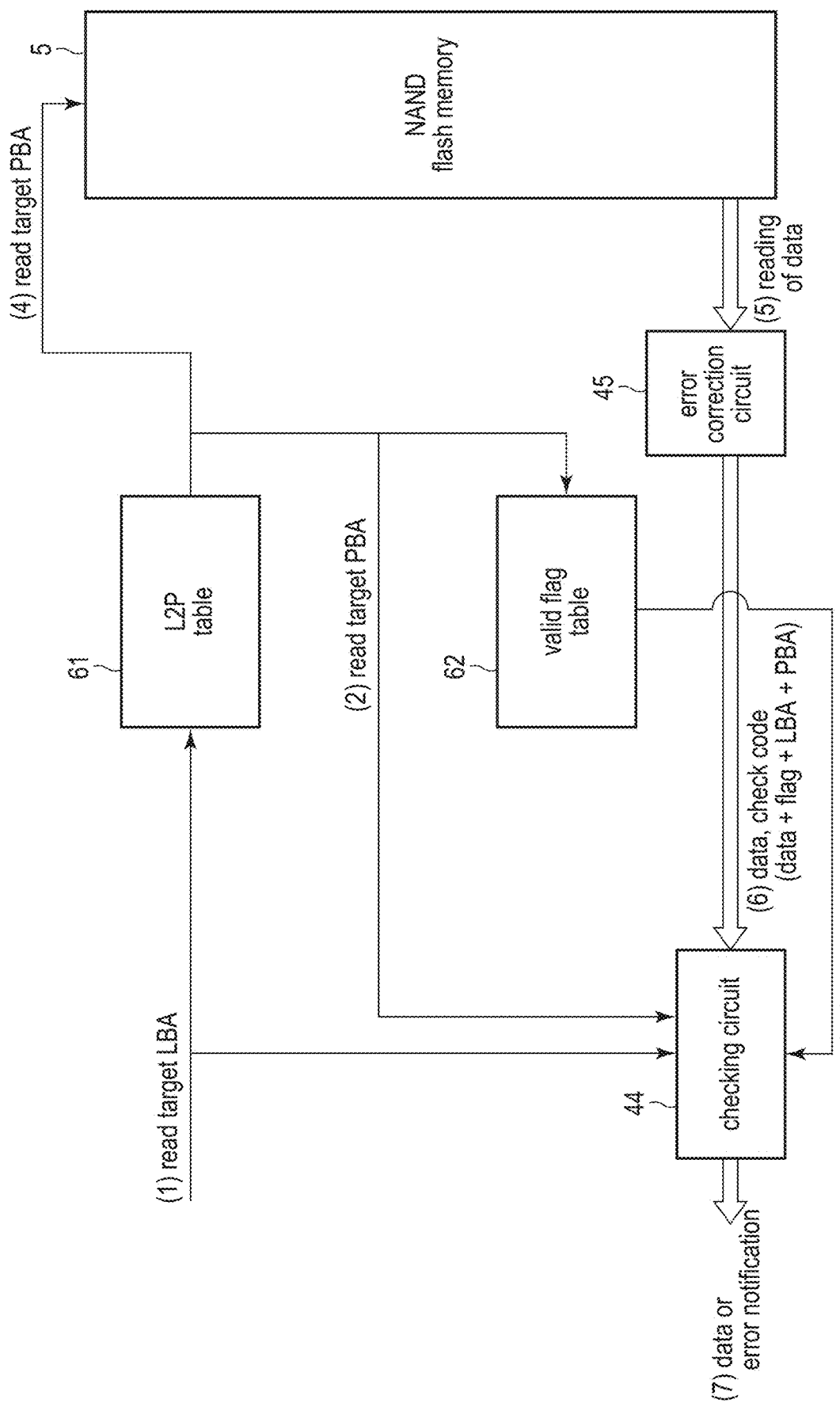
FIG. 8 is a diagram illustrating a flow of a read process of the memory system according to the embodiment.

FIG. 8 is a diagram illustrating a flow of the read process, focusing on the configuration example related to the read process of the memory system. The controller 4 of the SSD 3 executes the read process in response to reception of a read command from the host 2.

(1) A read target LBA which is specified by the read command is output to the L2P table 61 and the checking circuit 44.

(2) The controller 4 acquires, from the L2P table 61, a PBA that has been mapped to the read target LBA at the time of execution of the read command, as a read target PBA. The controller 4 outputs the acquired read target PBA to the checking circuit 44 and the valid flag table 62.

(3) The controller 4 acquires from the valid flag table 62 a flag corresponding to the read target PBA. The controller 4 outputs the acquired flags to the checking circuit 44.

(4) The controller 4 outputs the read target PBA to the NAND flash memory 5 and instructs the NAND flash memory 5 to read data.

(5) The NAND flash memory 5 reads data (ECC frame) stored in a storage location indicated by the read target PBA and outputs the data (ECC frame) to the error correction circuit 45.

(6) The error correction circuit 45 decodes the ECC frame and generates error-corrected data (user data and check code). The error correction circuit 45 outputs the generated data (user data and check code) to the checking circuit 44.

(7) The checking circuit 44 generates a check code in the check code generation circuit 441, using the user data output from the error correction circuit 45, the flag acquired from the valid flag table 62, the read target LBA, and the read target PBA. The checking circuit 44 compares the check code output from the error correction circuit 45 with this generated check code. When the two check codes match each other, the checking circuit 44 determines that the correct user data has been read, and transmits the read user data to the host 2. When the two check codes do not match each other, the checking circuit 44 determines that wrong data has been read, and executes error processing. In the error processing, the controller 4 does not transmit the read user data to the host 2, but notifies the host 2 of an error, for example.

FIG. 9 is a diagram illustrating a flow of the garbage collection process in the memory system. The controller 4 of the SSD 3 starts the GC process in response to the event that the number of free blocks in the SSD 3 falls below the threshold value. Once the GC process is started, an arbitrary block is selected as a copy source block from a set of blocks managed by the active block list 63. The block to be selected is, for example, a block having a low rate of valid data among the data stored therein.

(1) The valid flag table 62 selects, as the GC copy source PBA, a PBA whose corresponding flag indicates the first value among a plurality of PBAs corresponding to a plurality of storage locations in the copy source block. The valid flag table 62 outputs the selected PBA to the flash PBA allocation unit 433 as the GC copy source PBA.

(2) The controller 4 outputs the GC copy source PBA to the NAND flash memory 5 as the read target PBA, and instructs the NAND flash memory 5 to read data.

(3) The NAND flash memory 5 reads data (ECC frame) from the read target PBA and outputs the data (ECC frame) to the error correction circuit 45.

The error correction circuit 45 decodes the ECC frame and generates error-corrected data (user data and check code). The error correction circuit 45 outputs the generated data (user data and check code) to the checking circuit 44.

(5) The flash PBA allocation unit 433 allocates a physical address indicating the storage location where the data read from the GC copy source PBA is to be written as the GC copy destination PBA. The flash PBA allocation unit 433 outputs the allocated GC copy destination PBA to the NAND flash memory 5.

(6) The flash PBA allocation unit 433 outputs the allocated GC copy destination PBA to the checking circuit 44.

(7) The checking circuit 44 generates a check code in the check code generation circuit 441, using the data (user data, i.e., GC copy target data) read from the GC copy source PBA of the NAND flash memory 5, a flag having the first value, the GC copy target LBA, and the GC copy destination PBA. The checking circuit 44 outputs the GC copy target data and the generated check code to the error correction circuit 45.

(8) The error correction circuit 45 generates an error correction code (ECC) using the GC copy target data and the check code. Then, the NAND flash memory 5 outputs the GC copy target data, the check code and the ECC to the NAND flash memory 5 as write data (ECC frame). The NAND flash memory 5 writes the write data (ECC frame) to a storage location indicated by the GC copy destination PBA output by the flash PBA allocation unit 433.

(9) Then, the controller 4 acquires, from the L2P table 61, a PBA that has been mapped to the LBA corresponding to the GC copy target data at the time of execution of the copy operation, as a final PBA. The controller 4 updates the mapping information of the L2P table 61 so that the GC copy destination PBA is mapped to the LBA corresponding to the GC copy target data. Then, the controller 4 sets a flag in the valid flag table 62, which corresponds to the GC copy destination PBA, to the first value ("flag set" in FIG. 9).

(10) The controller 4 sets a flag in the valid flag table 62, which corresponds to the acquired final PBA, to the second value ("flag reset" in FIG. 9).

As described above, the write process, the invalidation process, the read process, and the garbage collection process of the memory system are performed.

Next, various check methods in the memory system of this embodiment will be explained with specific examples.

(Check Using the First Method (Logical-to-Physical Map Flag Determination Method (Data; PBA and/or LBA; and Flag)) and the PBA Additional Information)

First, such a case will be explained that read data is checked using (i) a physical address stored in the NAND flash memory 5 along with data and (ii) a value of a valid flag managed in the valid flag table 62. In other words, the case in which the first method (logical-to-physical map flag determination method) is used to check the flag and the additional information is the PBA itself (PBA additional information), will be explained.

Figure 10:
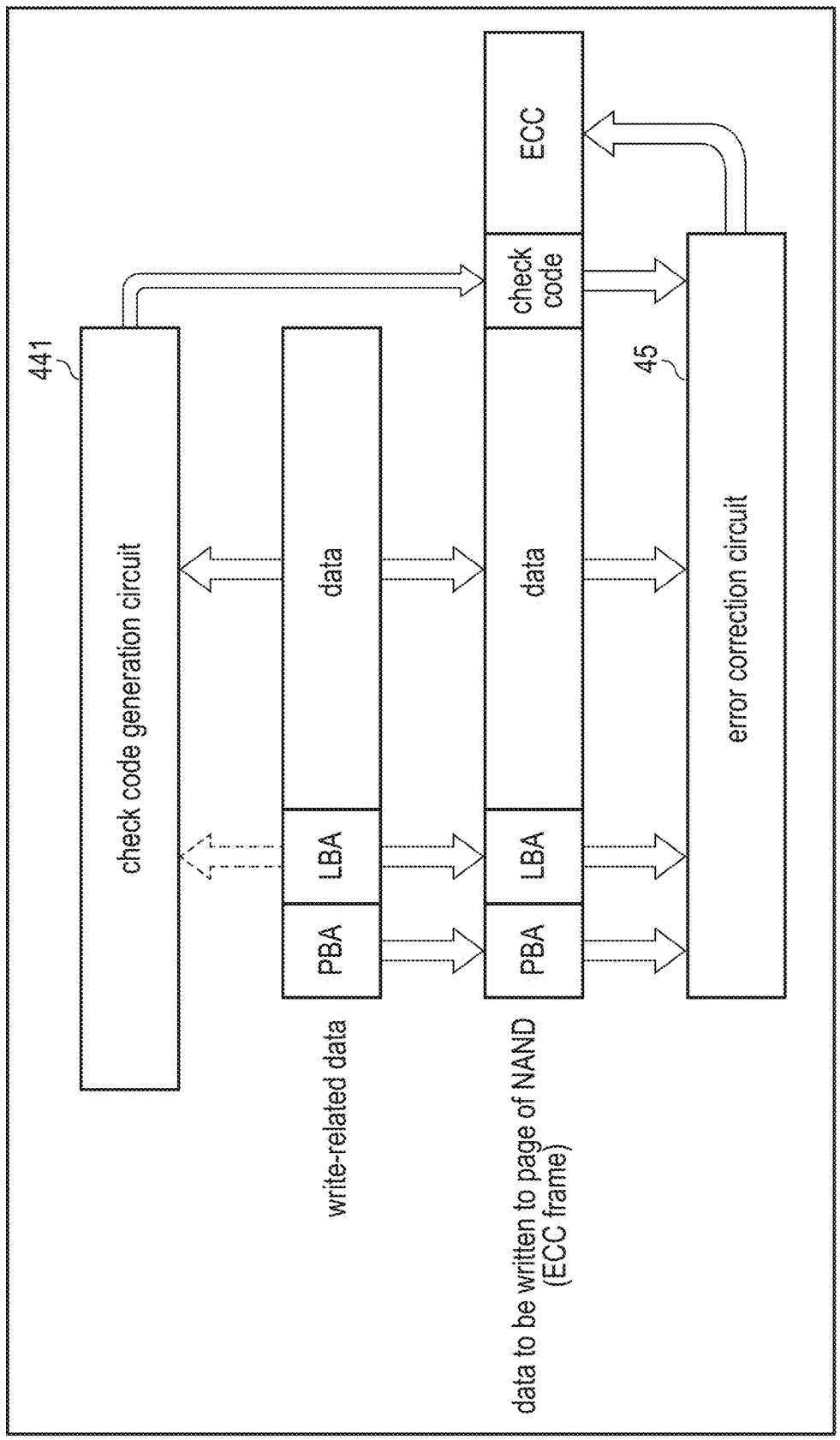
FIG. 10 is a diagram illustrating a first example of write data of the memory system according to the embodiment.

First, the write data is explained. FIG. 10 is a diagram illustrating a first example of the write data of the memory system according to the embodiment.

Write-related data is data related to data to be written to the NAND flash memory 5 and is used in the write process. The write-related data includes, for example, user data, LBA, and PBA. The user data is data associated with a write command received from the host 2. The LBA is a request LBA (write destination LBA) specified by this write command. The PBA is a write destination PBA allocated to the write destination LBA by the flash PBA allocation unit 433. Note that it suffices that the write-related data includes the user data and the PBA, and it does not necessarily need to include the LBA.

The check code generation circuit 441 generates a check code using at least the user data. Note that the check code generation circuit 441 may generate a check codes using one of the LBA and the PBA or both the LBA and the PBA in addition to the user data.

The error correction circuit 45 generates an ECC frame by encoding a data set that contains the user data, the LBA, the PBA, and the check code. Then, the ECC frame containing the user data, the LBA, the PBA, the check code, and the ECC is written to a same page of the NAND flash memory 5.

Figure 11:
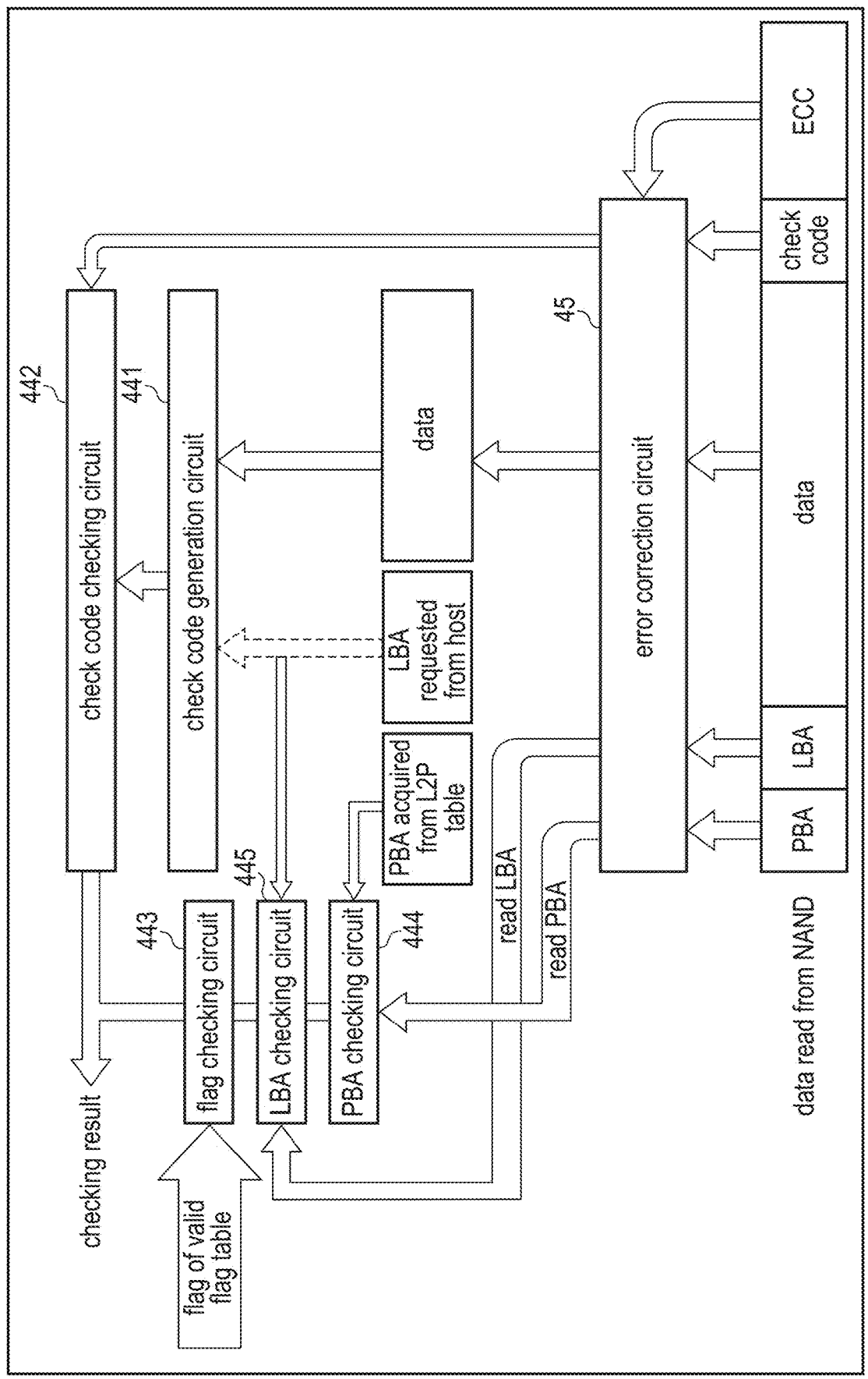
FIG. 11 is a diagram illustrating a first example of read data of the memory system according to the embodiment.

Next, the case where the write data described in FIG. 10 is read from the NAND flash memory 5 will be described. FIG. 11 is a diagram illustrating a first example of read data of the memory system of the embodiment.

The read data read from the NAND flash memory 5 includes user data, a LBA, a PBA, a check code, and an ECC. The error correction circuit 45 executes error correction on the read data by executing a decoding process.

When the error correction is completed, the error correction circuit 45 outputs the user data, the LBA, the PBA, and the check code.

The flag checking circuit 443 checks whether or not a value of a flag corresponding to a PBA that has been mapped to the LBA specified by the read command at time of execution of the read continues to be maintained at the first value. When the flag is the first value, the flag checking circuit 443 determines that the correct data has been read. When the flag is the second value, the flag checking circuit 443 determines that wrong data has been read due to corruption of part of the mapping information in the L2P table 61.

The PBA checking circuit 444 checks whether or not the PBA that has been mapped to the LBA specified by the read command at time of execution of the read matches the PBA output by the error correction circuit 45. When the two PBAs match each other, the PBA checking circuit 444 determines that correct data has been read. When the two PBAs do not match each other, the PBA checking circuit 444 determines that wrong user data has been read due to a malfunction of the address decoder of the NAND flash memory 5.

The LBA checking circuit 445 checks whether or not the LBA specified by the read command received from the host 2 matches the LBA output by the error correction circuit 45. When the two LBAs match each other, the LBA checking circuit 445 determines that the correct data has been read. When the two LBAs do not match each other, the LBA checking circuit 445 determines that wrong data has been read due to corruption of part of the mapping information in the L2P table 61.

The check code generation circuit 441 generates a check code by using at least the user data output by the error correction circuit 45. For example, here, such a case is assumed that the check code was generated using either one or both of LBA and PBA in addition to the user data at the time of write of this data. In this case, the check code generation circuit 441 generates the check code using one or both of the LBA specified by the read command and the PBA that has been mapped to this LBA at time of execution of the read, in addition to the user data output by the error correction circuit 45.

The check code checking circuit 442 checks whether or not the check code generated by the check code generation circuit 441 matches the check code output by the error correction circuit 45. When the two check codes do not match each other, the check code checking circuit 442 determines that wrong data has been read. When the two check codes match each other, the check code checking circuit 442 determines that the correct data has been read.

When the check code checking circuit 442, the flag checking circuit 443, the PBA checking circuit 444, and the LBA checking circuit 445 all determine that the correct data has been read, the controller 4 transmits the read data (user data) to the host 2.

When any of the check code checking circuit 442, the flag checking circuit 443, the PBA checking circuit 444, and the LBA checking circuit 445 determines that wrong data has been read, the controller 4 executes an error process. For example, the controller 4 notifies the host 2 of the error as error processing. In this case, the controller 4 may transmit to the host 2 a response indicating that the processing of the read command failed as a completion response indicating the completion of the read command.

When only the PBA checking circuit 444 determines that wrong user data has been read, the controller 4 may once again execute the process of reading data from the storage location in the NAND flash memory 5, which is indicated by the read target PBA as an error process. This is because there may be a possible case where data is read from a storage location different from that indicated by the read target PBA due to a malfunction of the address decoder in the NAND flash memory 5, which can be considered as a cause of detection of an error only by the PBA checking circuit 444.

Figure 12:
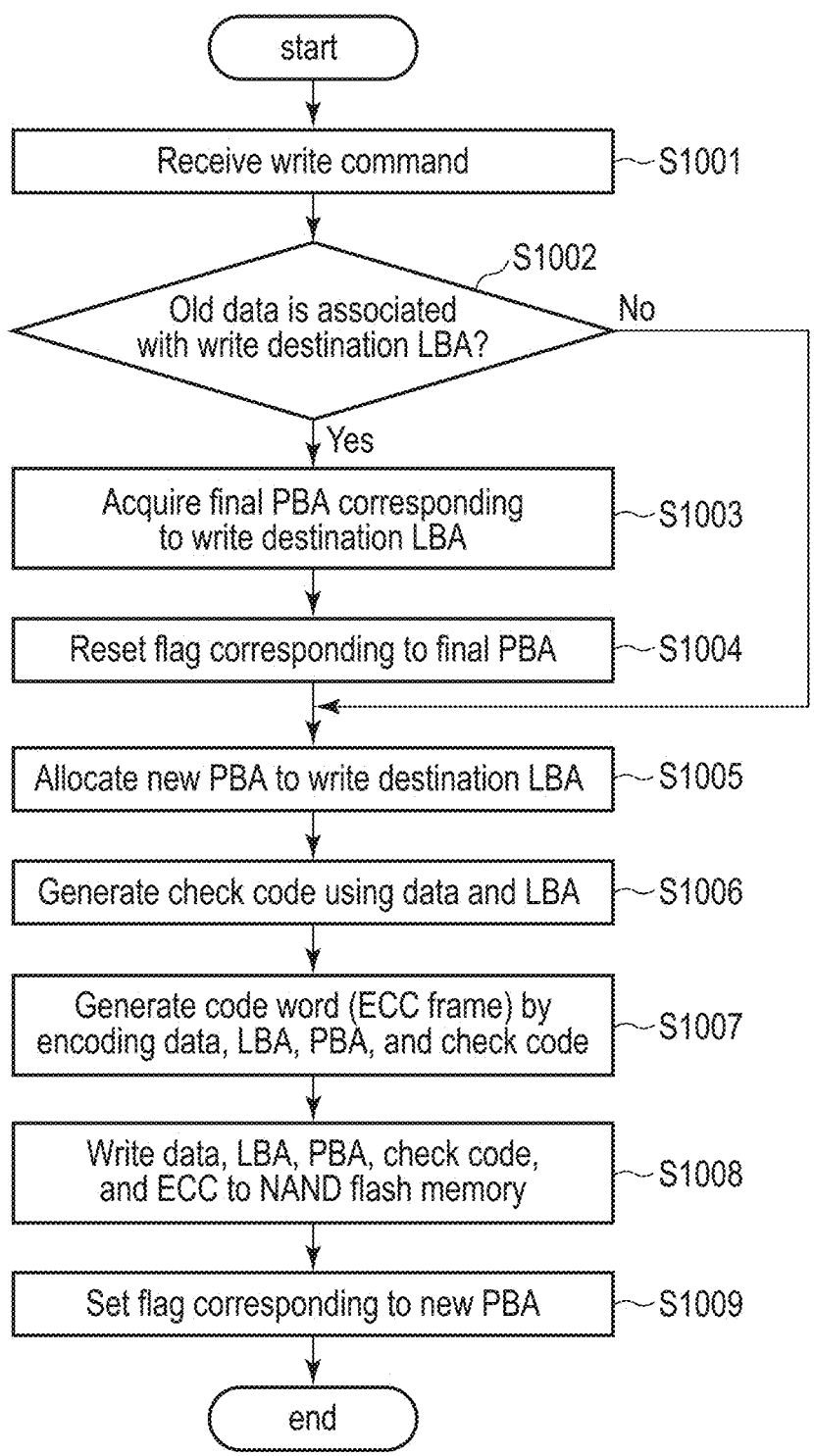
FIG. 12 is a flowchart illustrating a first example of a procedure of the write process of the memory system of the embodiment.

Next, a procedure of the write process will be described. FIG. 12 is a flowchart illustrating a first example of a procedure of the write process in the memory system of the embodiment.

The controller 4 starts the write process in response to reception of a write command from the host 2 by the SSD 3 (step S1001).

The controller 4 determines whether or not old data is associated with the write destination LBA specified by the write command received in step S1001 (step S1002). The controller 4 determines that the old data is associated with the write destination LBA when a PBA is mapped to the write destination LBA in the L2P table 61.

When the old data is associated with the write destination LBA (Yes at S1002), the controller 4 acquires from the L2P table 61 a final PBA mapped to the write destination LBA (step S1003).

The controller 4 resets the flag in the valid flag table 62, which corresponds to the final PBA (step S1004). In step S1004, the flag corresponding to the final PBA is set to the second value in the valid flag table 62.

When no old data is associated with the write destination LBA (No at S1002), the controller 4 skips processing in steps S1003 and S1004.

The controller 4 allocates a new PBA to the write destination LBA (step S1005). The allocated PBA is a write destination PBA that indicates a storage location where the data associated with the write command is to be written.

The controller 4 generates a check code in the check code generation circuit 441, using the data associated with the write command received in step S1001 and the write destination LBA (step S1006). This check code is a code for checking the integrity of information including the data and the write destination LBA.

The controller 4 generates a code word (ECC frame) by encoding the data, the write destination LBA, the write destination PBA, and the check code (step S1007).

The controller 4 writes the data, the write destination LBA, the write destination PBA, the check code, and the ECC to the storage location in the NAND flash memory 5, indicated by the write destination PBA (step S1008).

The controller 4 sets a flag in the valid flag table 62, which corresponds to the write destination PBA (step S1009), and terminates the write process. In step S1009, the controller 4 sets the flag corresponding to the write destination PBA to the first value.

Note that the write process illustrated in FIG. 12 is described in connection with the case where data, write destination LBA, write destination PBA, and check code are written to the NAND flash memory 5. But note that the controller 4 may write only the data, write destination PBA, and check code to the NAND flash memory 5 without writing the write destination LBA to the NAND flash memory 5. This is because the check code is generated using the data and the write destination LBA.

Figure 13:
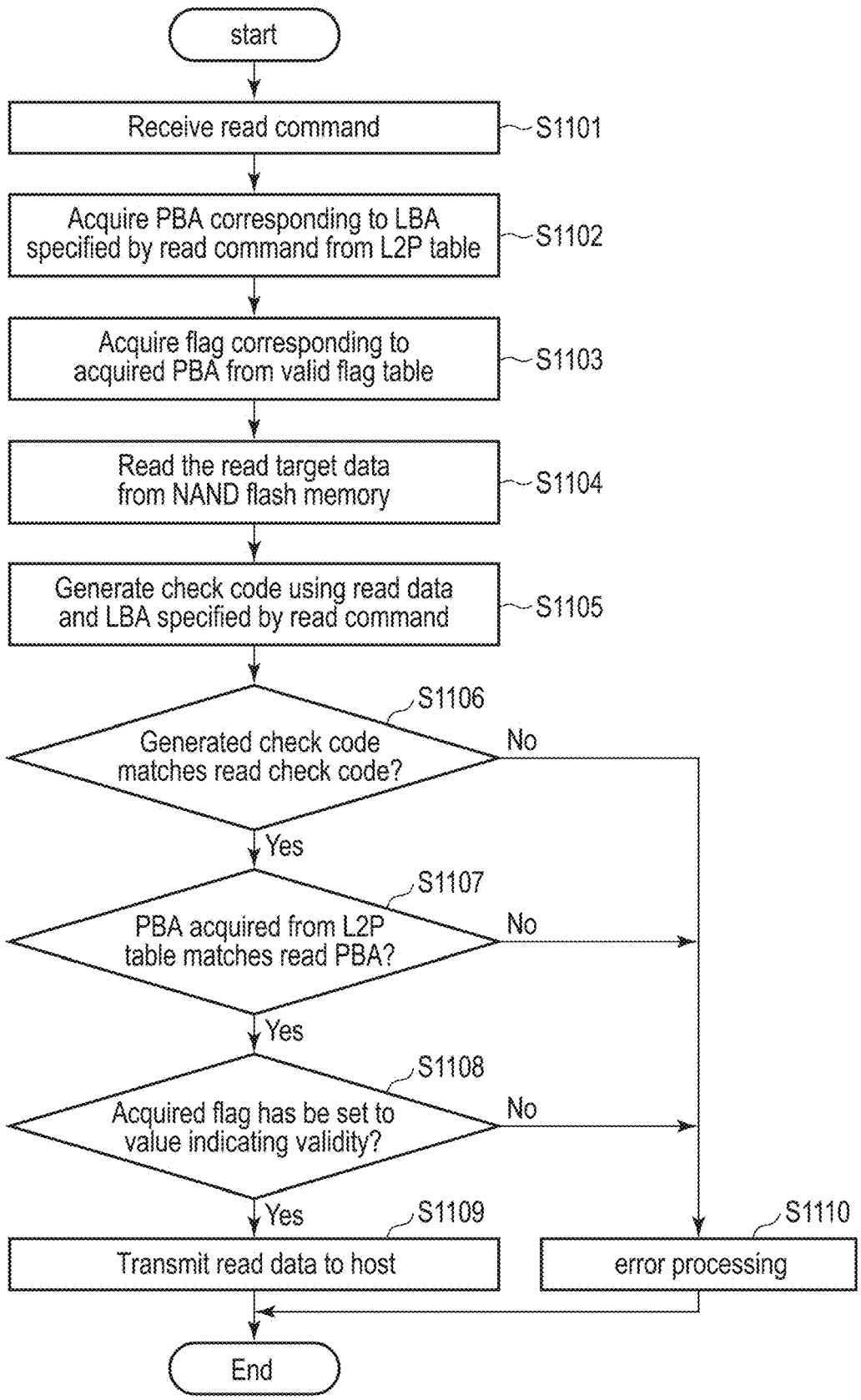
FIG. 13 is a flowchart illustrating a first example of a procedure of the read process of the memory system of the embodiment.

Next, a procedure of the read process will be described. FIG. 13 is a flowchart illustrating a first example of a procedure of the read process in the memory system.

The controller 4 starts the read process in response to reception of a read command from the host 2 by the SSD 3 (step S1101).

The controller 4 acquires from the L2P table 61 a PBA corresponding to a LBA specified by the read command received in step S1101 (step S1102).

The controller 4 acquires from the valid flag table 62 a flag corresponding to the PBA acquired in step S1102 (step S1103).

The controller 4 reads read target data stored in a storage location indicated by the PBA acquired in step S1102 (in this case, user data, LBA, PBA, and check code), from the NAND flash memory 5 (step S1104).

The controller 4 generates a check code in the check code generation circuit 441, using the user data contained in the read target data read in step S1104 and the LBA specified by the read command received in step S1101 in the check code generation circuit 441 (step S1105).

The controller 4 determines whether or not the check code generated in step S1105 matches the check code contained in the read target data read in step S1104 (step S1106).

The controller 4 determines whether or not the PBA acquired from the L2P table 61 in step S1102 matches the PBA contained in the read target data read out in step S1104 (step S1107).

The controller 4 determines whether or not the flag acquired in step S1103 is set to a value indicating validity (step S1108).

Note that the determinations in step S1106, S1107, and S1108 can be executed in any order.

When the check code generated in step S1105 matches the check code contained in the read target data read in step S1104 (Yes at step S1106), the PBA acquired from the L2P table 61 in step S1102 matches the PBA contained in the read target data read in step S1104 (Yes at step S1107), and further the flag acquired in step S1103 is set to a value indicating validity (Yes at step S1108), then the controller 4 transmits the data (user data) contained in the read target data read in step S1104 to the host 2 (step S1109), and thus the read process is completed.

When the check code generated in step S1105 does not match the check code contained in the read target data read in step S1104 (No at step S1106), or the PBA acquired from the L2P table 61 in step S1102 does not match the PBA contained in the read target data read in step S1104 (No at step S1107), or the flag acquired in step S1103 is set to a value indicating invalidity (No at step S1108), the controller 4 executes error processing (step S1110) and terminates the read process.

The above-provided explanation is based on the case where all of the flag, PBA, and check codes are checked, but in a check using the first method (logical-to-physical map flag determination method) and PBA (PBA additional information), the check using check codes (S1106) may be omitted. That is, in the check using the first method (logical-to-physical map flag determination method) and PBA (PBA additional information), the controller 4 determines whether or not to transmit data (user data) read from the NAND flash memory 5 to the host 2, based on whether or not such a condition is satisfied that the flag acquired in step S1103 is set to a value indicating validity and also the PBA read from the NAND flash memory 5 matches the latest PBA acquired from the L2P table 61.

(Check Using the Second Method (Check Code Determination Method (Data; Flag; and PBA) and the Check Code Additional Information)

Next, the case where a check code is generated using at least the data, flag, and physical address, and the read data is checked using this check code will be described. In other words, such a case will be explained that the second method (check code determination method) is used to check the flags, and the additional information is a check code (check code additional information).

Figure 14:
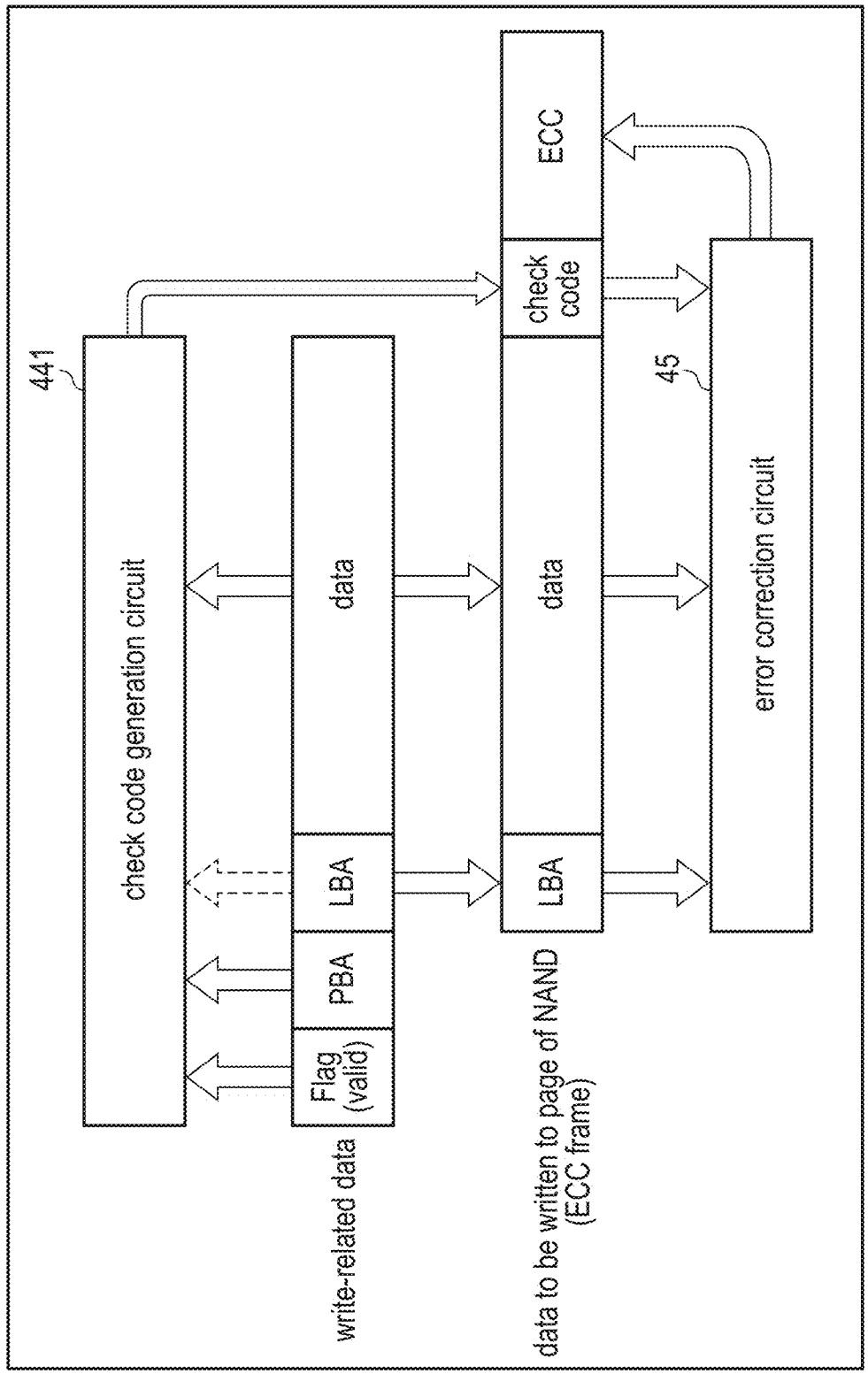
FIG. 14 is a diagram illustrating a second example of write data of the memory system according to the embodiment.

First, the write data will be explained. FIG. 14 is a diagram illustrating a second example of the write data of the memory system according to the embodiment.

The write-related data includes user data, a LBA, a PBA, and a flag. The user data is data associated with a write command received from the host 2. The LBA is a request LBA (write destination LBA) specified by this write command. The PBA is a write destination PBA allocated to the write destination LBA by the flash PBA allocation unit 433. The flag is a flag having the first value indicating valid data, that is, a 1-bit information indicating "1", for example.

Here, the check code generation circuit 441 generates a check code using at least the user data, the PBA, and the flag. Further, the check code generation circuit 441 may generate a check code as well using the LBA, in addition to the user data, the PBA, and the flag.

Then, the error correction circuit 45 generates an ECC frame by encoding a data set that contains the user data, the LBA, and the check code. The ECC frame containing the user data, the LBA, the check code, and the ECC is then written to a same page of the NAND flash memory 5.

Next, the case where the write data described with reference to FIG. 14 is read from the NAND flash memory 5 will be described. FIG. 15 is a diagram illustrating a second example of the read data of the memory system of the embodiment.

Read data read from the NAND flash memory 5 includes user data, a LBA, a check code, and an ECC. The error correction circuit 45 executes error correction on the read data by executing a decoding process.

When the error correction is completed, the error correction circuit 45 outputs the user data, the LBA, and the check code.

The check code generation circuit 441 generates a check code using the user data output by the error correction circuit 45, the PBA associated with the read target LBA in the L2P table 61, and the flag associated with this PBA in the valid flag table 62. When the check code has been generated by using a LBA in addition to the user data, the PBA, and the flag at the time of write of this data, the check code generation circuit 441 further uses the read target LBA which is specified by the read command received from the host 2 to generate the check code.

The check code checking circuit 442 checks whether or not the check code generated by the check code generation circuit 441 matches the check code output by the error correction circuit 45. When the two check codes do not match each other, the check code checking circuit 442 determines that wrong user data has been read. When the two check codes match each other, the check code checking circuit 442 determines that the correct user data has been read.

When the check code checking circuit 442 determines that the correct user data has been read, the controller 4 transmits the read user data to the host 2.

When the check code checking circuit 442 determines that wrong user data has been read, the controller 4 executes error processing. For example, the controller 4 notifies the host 2 of the error as an error process.

Figure 16:
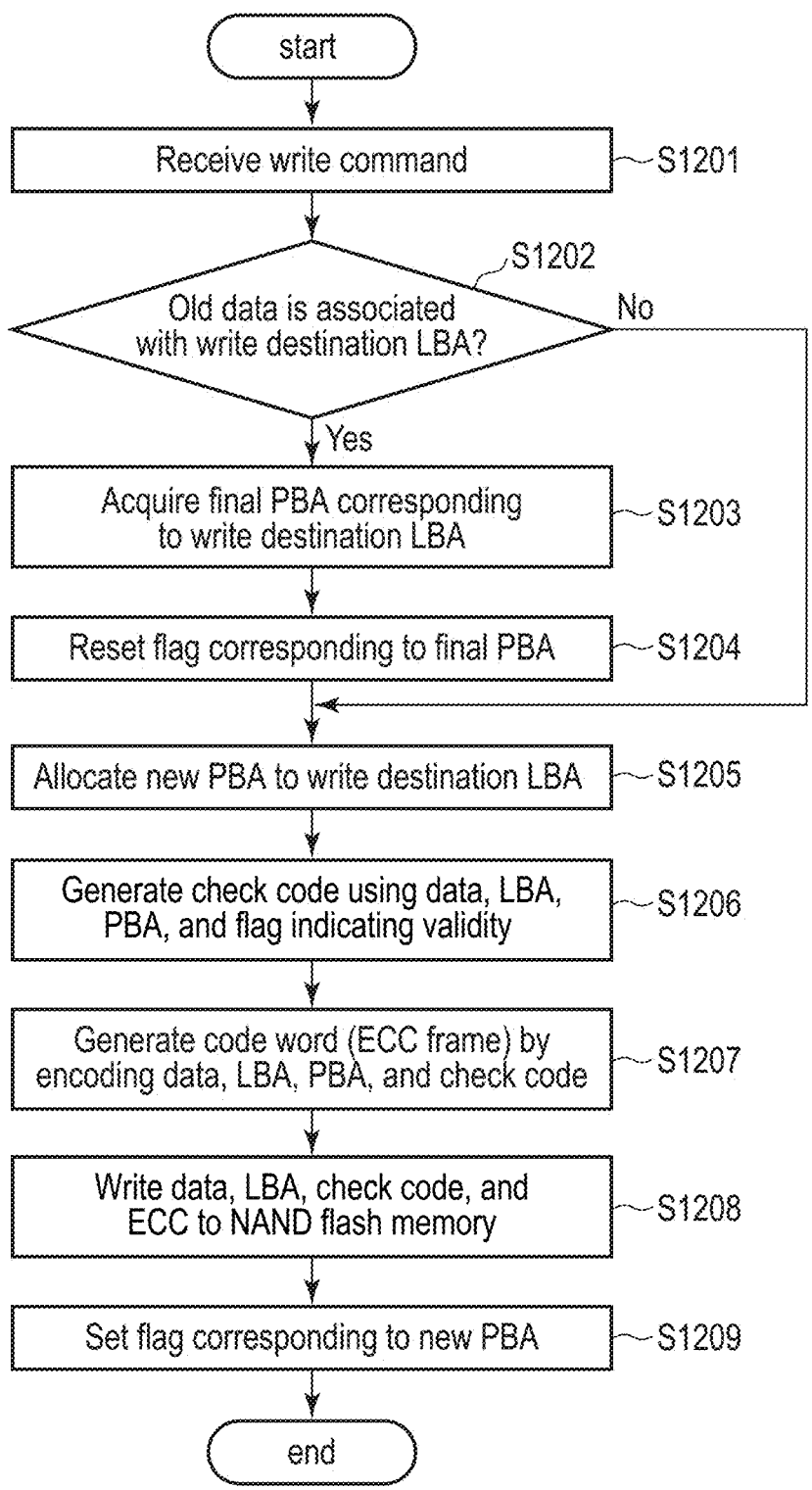
FIG. 16 is a diagram illustrating a second example of a procedure of the write process of the memory system of the embodiment.

Next, a procedure of the write process will be described. FIG. 16 is a flowchart illustrating a second example of a procedure of the write process in the memory system.

The controller 4 starts the write process in response to reception of a write command from the host 2 by the SSD 3 (step S1201).

The controller 4 determines whether or not old data is associated with the write destination LBA specified by the write command received in step S1201 (step S1202). The controller 4 determines that old data is associated with the write destination LBA when a PBA is mapped to the write destination LBA in the L2P table 61.

When old data is associated with the write destination LBA (Yes at step S1202), the controller 4 acquires from the L2P table 61 a final PBA mapped to the write destination LBA (step S1203).

The controller 4 resets a flag in the valid flag table 62, which corresponds to the final PBA (step S1204). In step S1204, the flag corresponding to the final PBA is set to the second value in the valid flag table 62.

If no old data is associated with the write destination LBA (No at step S1202), the controller 4 skips processing in steps S1203 and S1204.

The controller 4 allocates a new PBA to the write destination LBA (step S1205). The allocated PBA is a write destination PBA that indicates a storage location where the data associated with the write command is to be written.

The controller 4 generates a check code in the check code generation circuit 441, using the data associated with the write command received in step S1201, the write destination LBA, the PBA allocated in step S1205, and a flag set to a value indicating validity (step S1206). This check code is a code for checking the integrity of information containing the data, the write destination LBA, the PBA, and the flag.

The controller 4 generates a code word (ECC frame) by encoding the data, the write destination LBA, and the check code (step S1207).

The controller 4 writes the data, the write destination LBA, the check code, and the ECC to a storage location in the NAND flash memory 5, indicated by the write destination PBA (step S1208).

The controller 4 sets a flag in the valid flag table 62, which corresponds to the write destination PBA (step S1209), and terminates the write process. In step S1209, the controller 4 sets the flag corresponding to the write destination PBA to the first value.

The write process shown with reference to FIG. 16 is described in connection with the case where data, write destination LBA, and check code are written to the NAND flash memory 5, but only the data and the check code may be written to the NAND flash memory 5 without writing the write destination LBA to the NAND flash memory 5.

Figure 17:
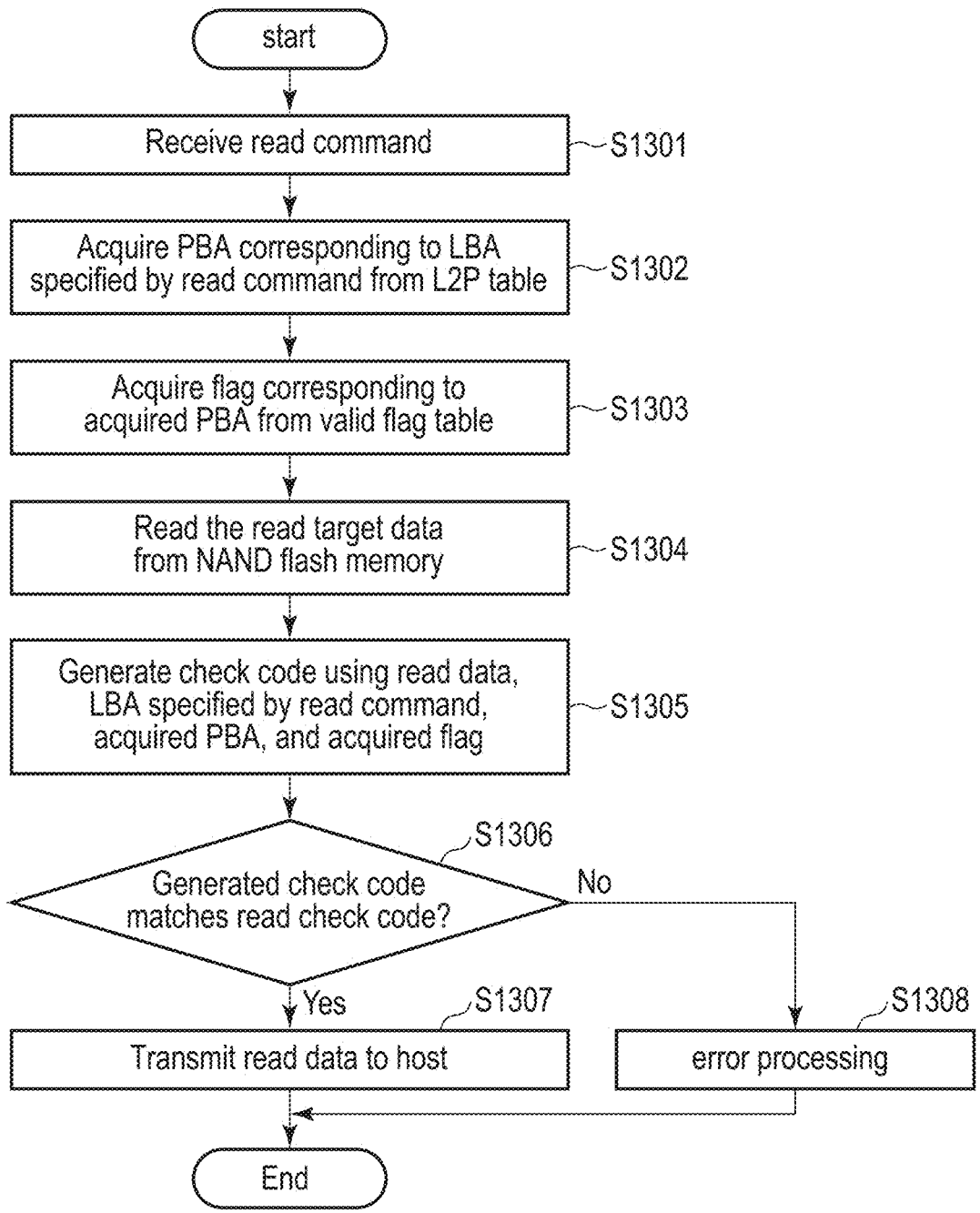
FIG. 17 is a diagram illustrating a second example of a procedure of the read process of the memory system of the embodiment.

Next, a procedure of the read process will be described. FIG. 17 is a flowchart illustrating a second example of a procedure of the read process in the memory system of the embodiment.

The controller 4 starts the read process in response to reception of a read command from the host 2 by the SSD 3 (step S1301).

The controller 4 acquires from the L2P table 61 a PBA corresponding to a LBA specified by the read command received in step S1301 (step S1302).

Then, the controller 4 acquires from the valid flag table 62 a flag corresponding to the PBA acquired in step S1302 (step S1303).

The controller 4 reads the read target data (here, data, LBA, and check code) stored in the storage location indicated by the PBA acquired in step S1302, from the NAND flash memory 5 (step S1304).

The controller 4 generates a check code in the check code generation circuit 441, using the data contained in the read target data read in step S1304, the LBA specified by the read command received in step S1301, the PBA acquired in step S1302, and the flag acquired in step S1303 (step S1305).

The controller 4 determines whether or not the check code generated in step S1305 matches the check code contained in the read target data read in step S1304 (step S1306).

When the check code generated in step S1305 matches the check code contained in the read target data read in step S1304 (Yes at step S1306), the controller 4 transmits the data (user data) contained in the read target data read in step S1304 to the host 2 (step S1307), and terminates the read process.

When the check code generated in step S1305 does not match the check code contained in the read target data read in step S1304 (No at step S1306), the controller 4 executes error processing (step S1308) and terminates the read process.

(Check Using the First Method (Logical-to-Physical Map Flag Determination Method) and the Check Code Additional Information)

Next, such a case will be described that the read data is checked using (i) the check code generated using the data and the physical address and (ii) the value of the flag managed in the valid flag table 62. That is, the case where the first method (logical-to-physical map flag determination method) is used to check the flags and the additional information is a check code will be described.

First, the write data will be explained. FIG. 18 is a diagram illustrating a third example of the write data of the memory system according to the embodiment.

The write-related data includes user data, LBA, and PBA. The user data is data associated with a write command received from the host 2. The LBA is a request LBA (write destination LBA) specified by this write command. The PBA is a write destination LBA allocated to the write destination LBA by the flash PBA allocation unit 433.

The check code generation circuit 441 generates a check code using at least the user data and the write destination PBA. The check code generation circuit 441 may generate a check code as well using the LBA, in addition to the user data and the write destination PBA.

The error correction circuit 45 generates an ECC frame by encoding a data set containing the user data, the LBA, and the check code. Then, the ECC frame containing the user data, the LBA, the check code, and the ECC is written to a same page of the NAND flash memory 5.

Figure 19:
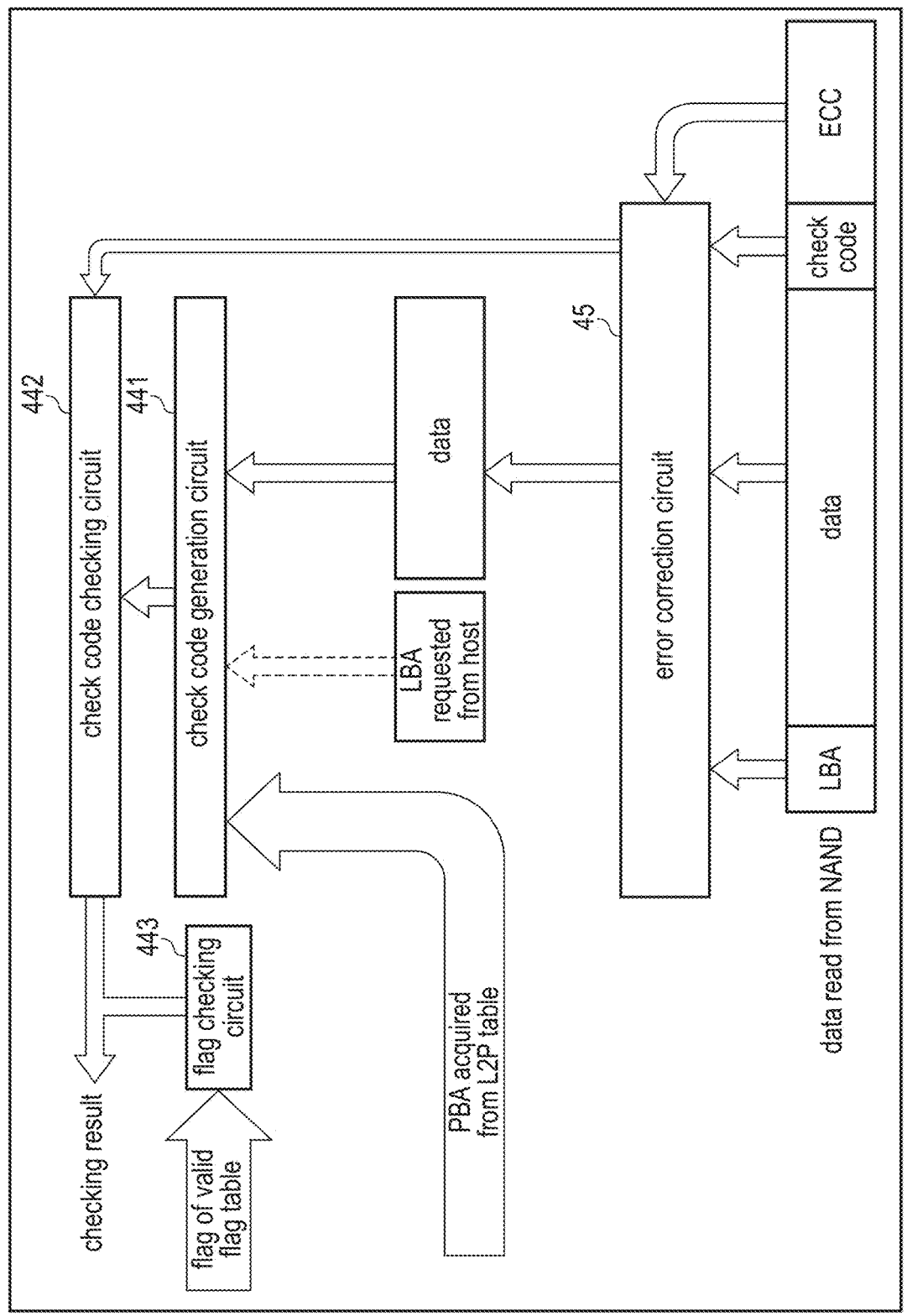
FIG. 19 is a diagram illustrating a third example of read data of the memory system according to the embodiment.

Next, the case where the write data described with reference to FIG. 18 is read from the NAND flash memory 5 will be described. FIG. 19 is a diagram illustrating a third example of the read data in the memory system of the embodiment.

The read data read from the NAND flash memory 5 includes user data, a LBA, a check code, and an ECC. The error correction circuit 45 executes error correction on the read data by executing a decoding process.

When the error correction is completed, the error correction circuit 45 outputs the user data, the LBA, and the check code.

The check code generation circuit 441 generates a check code using the user data output by the error correction circuit 45 and a PBA associated with the read target LBA specified by the read command received from the host 2. Further, when a LBA is used in addition to the user data and PBA at the time of write of this data, the check code generation circuit 441 generates a check code using the LBA specified by the read command received from the host 2 in addition to the user data output by the error correction circuit 45 and the PBA associated with the LBA designated by the read command received from the host 2.

The check code checking circuit 442 checks whether or not the check code generated by the check code generation circuit 441 matches the check code output by the error correction circuit 45. When the two check codes do not match each other, the check code checking circuit 442 determines that wrong user data has been read. When the two check codes match each other, the check code checking circuit 442 determines that the correct user data has been read.

The flag checking circuit 443 checks whether or not a value of a flag corresponding to a PBA that is associated with the read target LBA specified by the read command in the L2P table 61 is the first value. When the flag is the first value, the flag checking circuit 443 determines that the correct user data has been read. When the flag is at the second value, the flag checking circuit 443 determines that wrong user data has been read.

When both the check code checking circuit 442 and the flag checking circuit 443 determine that the correct user data has been read, the controller 4 transmits the read user data to the host 2.

When the check code checking circuit 442 or the flag checking circuit 443 determines that wrong user data has been read, the controller 4 executes an error process. For example, the controller 4 notifies the host 2 of the error as error processing.

When only the check code checking circuit 442 determines that wrong user data has been read, the controller 4 may once again execute the process of reading data from the storage location in the NAND flash memory 5, which is indicated by the read target PBA as an error processing. This is because there may be a possible case where data is read from a storage location different from that indicated by the read target PBA due to a malfunction of the address decoder in the NAND flash memory 5, which can be considered as a cause of detection of an error only by the check code checking circuit 442.

Figure 20:
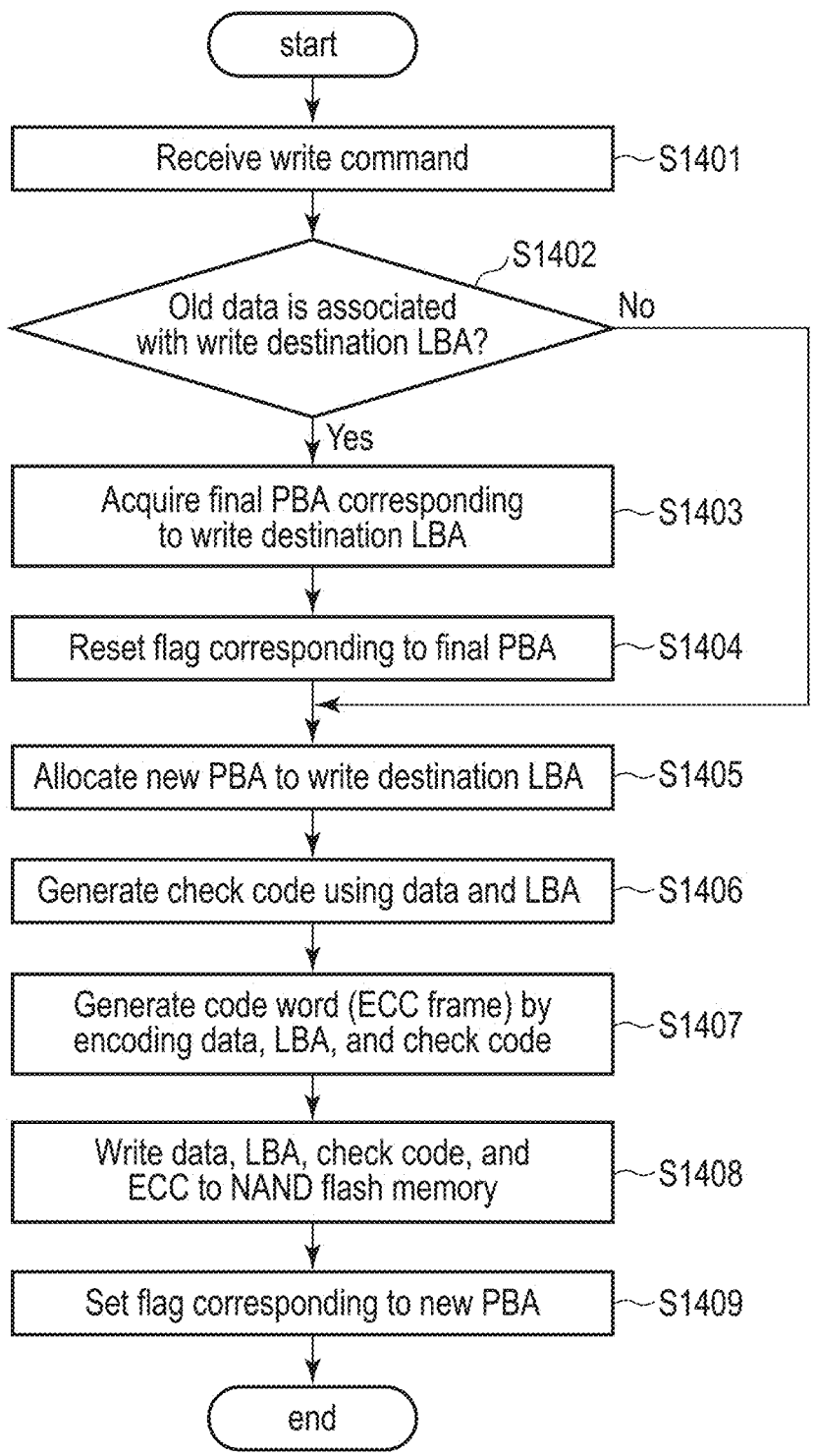
FIG. 20 is a diagram illustrating a third example of a procedure of the write process of the memory system of the embodiment.

Next, a procedure of the write process will be described. FIG. 20 is a flowchart illustrating a third example of a procedure of the write process in the memory system of the embodiment.

The controller 4 starts the write process in response to reception of a write command from the host 2 by the SSD 3 (step S1401).

The controller 4 determines whether or not old data is associated with the write destination LBA specified by the write command received in step S1401 (step S1402). The controller 4 determines that old data is associated with the write destination LBA when a PBA is mapped to the write destination LBA in the L2P table 61.

When old data is associated with the write destination LBA (Yes at step S1402), the controller 4 acquires from the L2P table 61 a final PBA mapped to the write destination LBA (step S1403).

Then, the controller 4 resets a flag in the valid flag table 62, which corresponds to the final PBA (step S1404). In step S1404, the flag corresponding to the final PBA is set to the second value in the valid flag table 62.

When no old data is associated with the write destination LBA (No at step S1402), the controller 4 skips processing in steps S1403 and S1404.

The controller 4 allocates a new PBA to the write destination LBA (step S1405). The allocated PBA is a write destination PBA indicating a storage location where the data associated with the write command is to be written.

The controller 4 generates a check code in the check code generation circuit 441, using the data associated with the write command received in step S1401, the write destination LBA, and the write destination PBA allocated in step S1405 (step S1406).

This check code is a code for checking the integrity of information containing the data, the write destination LBA, and the write destination PBA.

The controller 4 generates a code word (ECC frame) by encoding the data, the write destination LBA, and the check code (step S1407).

The controller 4 writes the data, the write destination LBA, the check code, and the ECC to the storage location in the NAND flash memory 5, which is indicated by the write destination PBA (step S1408).

The controller 4 sets a flag in the valid flag table 62, which corresponds to the write destination PBA (step S1409), and terminates the write process. In step S1409, the controller 4 sets the flag corresponding to the write destination PBA to the first value.

Note that the write process shown in FIG. 20 is described in connection with the case where the data, the write destination LBA, and the check code are written to the NAND flash memory 5, but only the data and the check code may be written to the NAND flash memory 5 without writing the write destination LBA to the NAND flash memory 5. This is because the check code is generated using the data, the write destination LBA and the write destination PBA.

Figure 21:
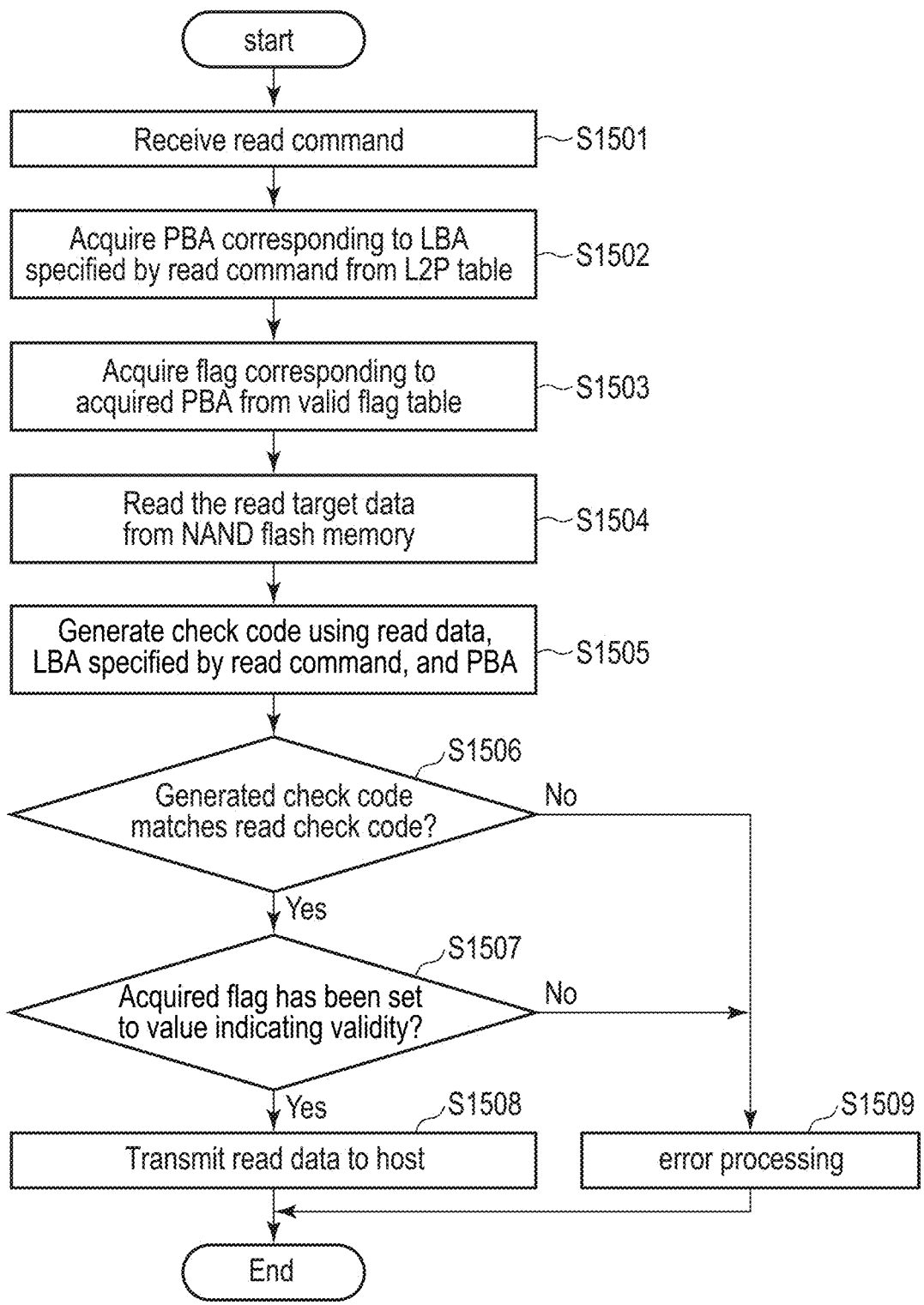
FIG. 21 is a diagram illustrating a third example of a procedure of the read process of the memory system of the embodiment.

Next, a procedure for the read process will be described. FIG. 21 is a flowchart illustrating a third example of a procedure of the read process in the memory system of the embodiment.

The controller 4 starts the read process in response to reception of a read command from the host 2 by the SSD 3 (step S1501).

The controller 4 acquires from the L2P table 61 a PBA corresponding to a LBA specified by the read command received in step S1501 (step S1502).

The controller 4 acquires from the valid flag table 62 a flag corresponding to the PBA acquired in step S1502 (step S1503).

The controller 4 reads the read target data (here, data, LBA, and check code) stored in the storage location indicated by the PBA acquired in step S1502 from the NAND flash memory 5 (step S1504).

The controller 4 generates a check code in the check code generation circuit 441, using user data contained in the read target data read in step S1504, the LBA specified by the read command received in step S1501, and the PBA acquired in step S1502 (step S1505).

The controller 4 determines whether or not the check code generated in step S1505 matches the check code contained in the read target data read in step S1504 (step S1506).

The controller 4 determines whether or not the flag acquired in step S1503 is set to a value indicating validity (step S1507).

The determinations in step S1506 and S1507 can be executed in any order.

When the check code generated in step S1505 matches the check code contained in the read target data read in step S1504 (Yes at step S1506) and further the flag acquired in step S1503 is set to a value indicating validity (Yes at step S1507), the controller 4 transmits the data (user data) contained in the read target data (user data) read in step S1504 to the host 2 (step S1508) and terminates the read process.

On the other hand, when the check code generated in step S1505 does not match the check code contained in the read target data read in step S1504 (No at step S1506), or the flag acquired in step S1507 is set to a value indicating invalidity (No at step S1507), the controller 4 executes error processing (step S1509) and terminates the read process.

(Check Using the Second Method (Check Code Determination Method) and the PBA Additional Information)

Next, such a case will be described that read data is checked using (i) the physical address stored along with the data in the NAND flash memory 5 and (ii) the check code generated using the user data and the flags managed in the valid flag table 62. That is, the case where the second method (check code determination method) is used to check the flags and the additional information is the PBA itself, will be described.

First, the write data is explained. FIG. 22 is a diagram illustrating a fourth example of the write data of the memory system according to the embodiment.

The write-related data includes user data, a LBA, a PBA, and a flag. The user data is data associated with a write command received from the host 2. The LBA is a request LBA (write destination LBA) specified by this write command. The PBA is a write destination PBA allocated to the write destination LBA by the flash PBA allocation unit 433. The flag is a flag having a first value indicating valid data, that is, 1-bit information indicating "1" for example. Note that it is suffices if the write-related data includes user data, PBA, and flag, and it does not necessarily need to include LBA.

The check code generation circuit 441 generates a check code using at least the user data and the flag. The check code generation circuit 441 may generate a check code using the LBA in addition to the user data and the flag.

The error correction circuit 45 generates an ECC frame by encoding a data set containing the user data, the LBA, the PBA, and the check code. The ECC frame including the user data, the LBA, the PBA, the check code, and the ECC is then written to a same page of the NAND flash memory 5.

Figure 23:
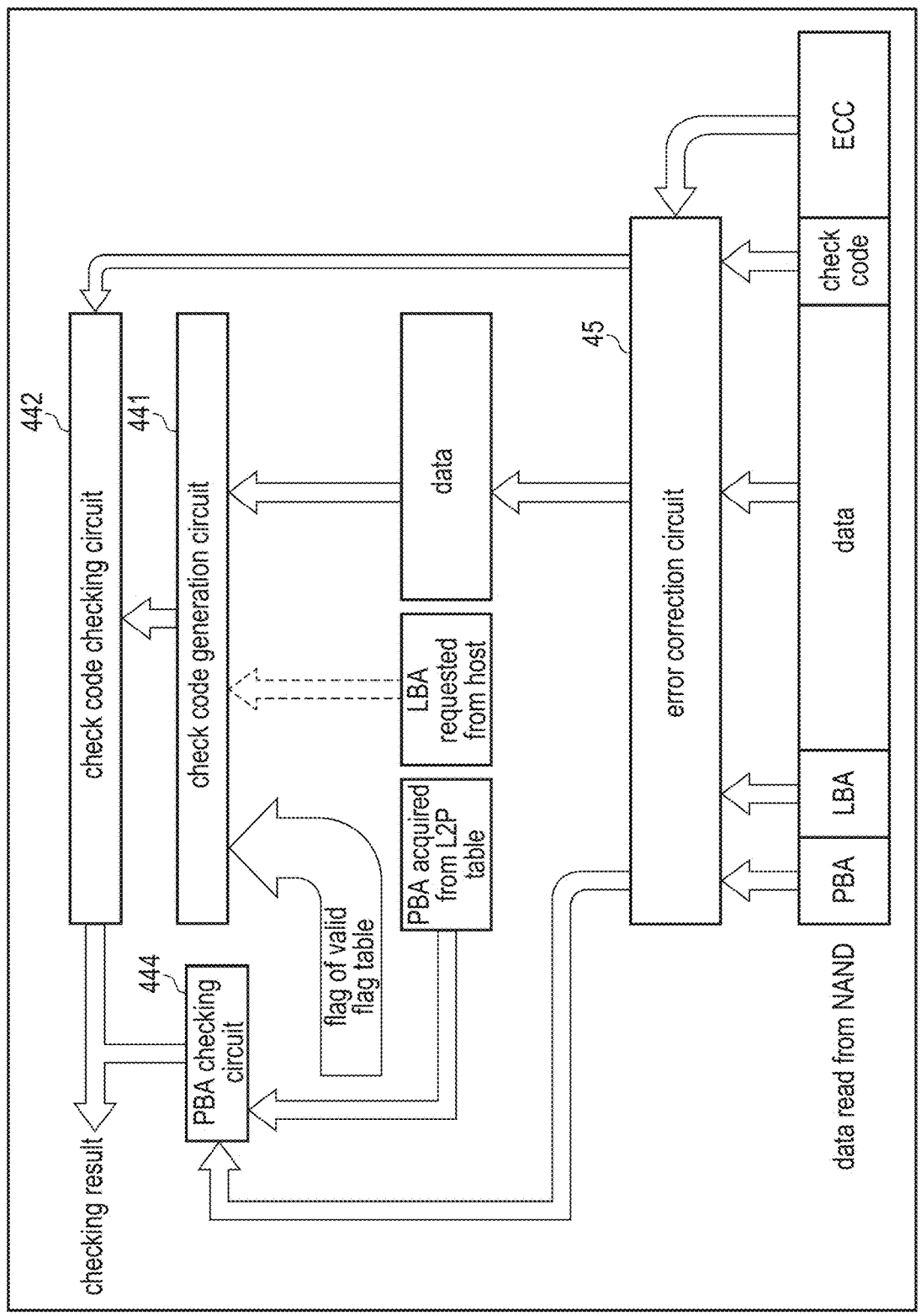
FIG. 23 is a diagram illustrating a fourth example of read data of the memory system according to the embodiment.

Next, the case where the write data described with reference to FIG. 22 is read from the NAND flash memory 5 will be described. FIG. 23 is a diagram illustrating a fourth example of the read data of the memory system according to the embodiment.

The read data read from the NAND flash memory 5 includes user data, a LBA, a PBA, a check code, and an ECC. The error correction circuit 45 executes error correction on the read data by executing a decoding process.

When the error correction is completed, the error correction circuit 45 outputs the user data, the LBA, the PBA, and the check code.

The check code generation circuit 441 generates a check code using at least the user data output by the error correction circuit 45 and a flag associated with the read target PBA in the valid flag table 62. When a LBA is used in addition to the user data and flags at the time of write of this data, the check code generation circuit 441 further uses the read target LBA specified by the read command received from the host 2 in addition to the user data and flag to generate the check code.

The check code checking circuit 442 checks whether or not the check code generated by the check code generation circuit 441 matches the check code output by the error correction circuit 45. When the two check codes do not match each other, the check code checking circuit 442 determines that wrong user data has been read. When the two check codes match each other, the check code checking circuit 442 determines that the correct user data has been read.

The PBA checking circuit 444 checks whether or not the PBA that has been mapped to the LBA specified by the read command at time of execution of the read matches the PBA output by the error correction circuit 45. When the two PBAs match each other, the PBA checking circuit 444 determines that the correct user data has been read. When the two PBAs do not match each other, the PBA checking circuit 444 determines that wrong user data has been read due to a malfunction of the address decoder of the NAND flash memory 5.

When both the check code checking circuit 442 and the PBA checking circuit 444 determine that the correct user data has been read, the controller 4 transmits the read user data to the host 2.

When the check code checking circuit 442 or the PBA checking circuit 444 determines that wrong user data has been read, the controller 4 executes error processing. For example, the controller 4 notifies the host 2 of the error as an error processing. In this case, the controller 4 may transmit to the host 2 a response indicating that the processing of the read command failed as a completion response indicating the completion of the read command.

When only the PBA checking circuit 444 determines that wrong user data has been read, the controller 4 may once again execute the process of reading data from the storage location in the NAND flash memory 5, which is indicated by the read target PBA as an error processing. This is because there may be a possible case where data is read from a storage location different from that indicated by the read target PBA due to a malfunction of the address decoder in the NAND flash memory 5, which can be considered as a cause of detection of an error only by the PBA checking circuit 444.

Figure 24:
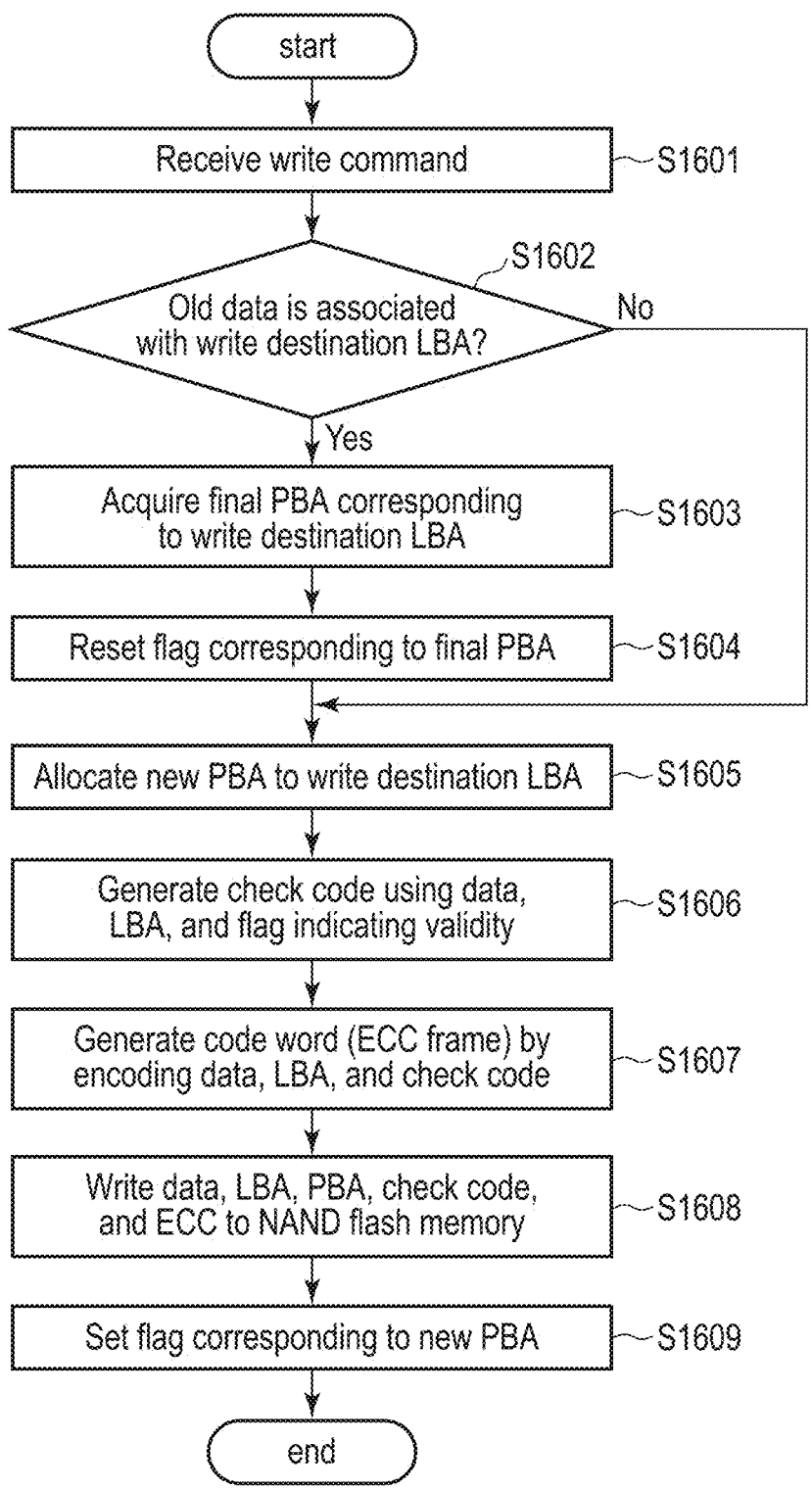
FIG. 24 is a diagram illustrating the fourth example of the procedure of the write process of the memory system of the embodiment.

Next, a procedure of the write process will be described. FIG. 24 is a flowchart illustrating a fourth example of a procedure of the write process in the memory system according to the embodiment.

The controller 4 starts the write process in response to reception of a write command from the host 2 by the SSD 3 (step S1601).

The controller 4 determines whether or not old data is associated with the write destination LBA specified by the write command received in step S1601 (step S1602). The controller 4 determines that old data is associated with the write destination LBA when a PBA is mapped to the write destination LBA in the L2P table 61.

When old data associated with the write destination LBA (Yes at step S1602), the controller 4 acquires from the L2P table 61 a final PBA mapped to the write destination LBA (step S1603).

The controller 4 resets a flag in the valid flag table 62, which corresponds to the final PBA (step S1604). In step S1604, the flag corresponding to the final PBA is set to the second value in the valid flag table 62.

If no old data is associated with the write destination LBA (No at step S1602), the controller 4 skips processing in steps S1603 and S1604.

The controller 4 allocates a new PBA to the write destination LBA (step S1605). The allocated PBA is a write destination PBA that indicates a storage location where the data associated with the write command is to be written.

The controller 4 generates a check code in the check code generation circuit 441, using the data associated with the write command received in step S1601, the write destination LBA, and a flag indicating validity (step S1606). This check code is code for checking the integrity of information containing the data, the write destination LBA, and the flag.

The controller 4 generates a code word (ECC frame) by encoding the data, the write destination LBA, the write destination PBA, and the check code (step S1607).

The controller 4 writes the data, the write destination LBA, the write destination PBA, the check code, and the ECC to the storage location in the NAND flash memory 5, which is indicated by the write destination PBA (step S1608).

The controller 4 sets a flag in the valid flag table 62, which corresponds to the write destination PBA (step S1609), and terminates the write process. In step S1609, the controller 4 sets the flag corresponding to the write destination PBA to the first value.

Note that the write process illustrated with reference to FIG. 24 is described in connection with the case where the data, the write destination LBA, the write destination PBA, and the check code are written to the NAND flash memory 5, but only the data, the write destination PBA, and the check code may be written to the NAND flash memory 5 without writing the write destination LBA to the NAND flash memory 5. This is because the check code is generated using the data, the write destination LBA, and the flag.

Next, a procedure for the read process will be described. FIG. 25 is a flowchart illustrating a fourth example of a procedure of the read process in the memory system according to the embodiment.

The controller 4 starts the read process in response to reception of a read command from the host 2 by the SSD 3 (step S1701).

The controller 4 acquires from the L2P table 61 a PBA corresponding to the LBA specified by the read command received in step S1701 (step S1702).

The controller 4 acquires from the valid flag table 62 a flag corresponding to the PBA acquired in step S1702 (step S1703).

The controller 4 reads the read target data (here, data, LBA, PBA, and check code) stored in the storage location indicated by the PBA acquired in step S1702 from the NAND flash memory 5 (step S1704).

The controller 4 generates a check code in the check code generation circuit 441, using the user data contained in the read target data read in step S1704, the LBA specified by the read command received in step S1701, and the flag acquired in step S1703 (step S1705).

The controller 4 determines whether or not the check code generated in step S1705 matches the check code contained in the read target data read in step S1704 (step S1706).

The controller 4 determines whether or not the PBA acquired from the L2P table 61 in step S1702 matches the PBA contained in the read target data read in step S1704 (step S1707).

The controller 4 determines whether or not the flag acquired in step S1703 is set to a value indicating validity (step S1708).

The determinations in step S1706 and S1707 can be executed in any order.

When the check code generated in step S1705 matches the check code contained in the read target data read in step S1704 (Yes at step S1706) and further the PBA acquired from the L2P table 61 in step S1702 matches the PBA contained in the read target data read in step S1704 (Yes at step S1707), the controller 4 transmits the data (user data) contained in the read target data read in step S1704 to the host 2 (step S1708), and then terminates the read process.

When the check code generated in step S1705 does not match the check code contained in the read target data read in step S1704 (No at step S1706), or the PBA acquired from the L2P table 61 in step S1702 does not match the PBA contained in the read target data read in step S1704 (No at step S1707), the controller 4 executes error processing (step S1709) and terminates the read process.

As explained above, according to this embodiment, in response to receiving a read command from the host 2, the controller 4 acquires from the L2P table 61 a physical address (PBA) that has been mapped to the logical address specified by the read command (read target LBA) at the time of execution of the read command, and reads data (user data) from the NAND flash memory 5 based on the acquired PBA. Then, the controller 4 determines whether or not to transmit the read data (user data) to the host 2, based on whether or not the current state of a flag corresponding to the acquired PBA continues to be the state where it is set to the first value. That is, the controller 4 can check, using the flag, whether or not the data read from the NAND flash memory 5 is the correct data, which is the latest data corresponding to the read target LBA, or wrong data, which is data other than the latest data corresponding to the read target LBA. With this configuration, even when wrong data is read from the NAND flash memory 5 due to some corruption of the mapping information in the L2P table 61, it is still possible to prevent this wrong data from being transmit to the host 2.

Specifically, when the current state of the flag corresponding to the acquired PBA is that it is set to the second value, the controller 4 notifies the host 2 of the error. With this configuration, the controller 4 can notify the host 2 of an error when old data of the same LBA is read due to the presence of an error in the L2P table 61.

Further, the controller 4 can check whether or not the data read from the NAND flash memory 5 is the correct data, using additional information determined directly or indirectly from the physical address.

When the additional information acquired based on the LBA specified by the read command received from the host 2 does not match the additional information contained in the data read from the NAND flash memory 5, the controller 4 executes error processing. In this case, it is detected that the PBA specified based on the read command and the PBA determined based on the data read from the NAND flash memory 5 do not match each other due to a defect in the NAND flash memory 5. Therefore, the controller 4 may execute the read process to read data from the NAND flash memory 5 once again as an error process. Or, the controller 4 may notify the host 2 of the error as an error process.

Note that in practice, corruption of the mapping information in the L2P table 61 or malfunction of the NAND flash memory 5 rarely occurs. Therefore, such a configuration that uses only flags to checks whether or not the data read from the NAND flash memory 5 is the correct data may be used. Or, such a configuration that uses only additional information to check whether the data read from the NAND flash memory 5 is the correct data may be used.

Alternatively, the controller 4 can use both the flags and the additional information to check whether the data read from the NAND flash memory 5 is the correct data or not.

When such a condition is satisfied that the flag indicates validity and the additional information acquired based on the LBA specified by the read command received from the host 2 and the additional information contained in the data read from the NAND flash memory 5 match each other, the controller 4 transmits the read data to the host 2. On the other hand, when such a condition is not satisfied, the controller 4 does not transmit the read data to the host 2. In this manner, the controller 4 determines whether or not to transmit the read data read from the NAND flash memory 5 to the host 2, based on whether or not the condition is satisfied that the flag indicates valid validity and the additional information acquired based on the LBA specified by the read command received from the host 2 matches the additional information contained in the data read from the NAND flash memory 5. With this configuration, even when either or both of corruption of the mapping information in L2P table 61 and malfunction of the NAND flash memory 5 occur, the controller 4 can still prevent wrong data from being send to the host 2 due to misreading.

Further, the controller 4 can generate a check code in the check code generation circuit 441 using a flag or physical address, and check that the read data is the correct data using the generated check code.

In this case, the SSD 3 only needs to execute the checking of the check code when checking the read data. Thus, the controller 4 does not need to separately execute checking of the flag and checking of the PBA.

As described above, when using flags and physical addresses to generate check codes, the SSD 3 does not require special hardware circuitry (for example, the flag checking circuit 443 and PBA checking circuit 444 shown in FIG. 1) for checking of read data. Further, even in the case of misreading due to malfunction of the NAND flash memory 5 without writing the physical address to the NAND flash memory 5, the reading of wrong data can be detected, and therefore the physical storage space of the NAND flash memory 5 can be used more effectively.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system connectable to a host, comprising:
a nonvolatile memory; and
a controller configured to control the nonvolatile memory, wherein
the controller is configured to:
manage mapping information using a first management table, the mapping information indicating a mapping between a plurality of logical addresses used by the host to access the memory system and a plurality of physical addresses of the nonvolatile memory;
manage a plurality of flags using a second management table, the plurality of flags being respectively associated with the plurality of physical addresses, each of the plurality of flags being set to either a first value or a second value, the first value indicating that data stored in a storage location of the nonvolatile memory corresponding to an associated physical address is valid data, the second value indicating that data stored in the storage location of the nonvolatile memory corresponding to the associated physical address is invalid data;
in response to receiving a write command specifying a first logical address from the host, allocate a first physical address to the first logical address, write first data associated with the write command to a first storage location of the nonvolatile memory corresponding to the first physical address, and set a first flag corresponding to the first physical address to the first value;
in response to that the first data is made invalid data by updating or deleting of the first data, set the first flag to the second value; and
in response to receiving a read command specifying the first logical address from the host, acquire from the first management table a physical address that has been mapped to the first logical address at a time of execution of the read command, read data from the nonvolatile memory based on the acquired physical address, and determine whether or not to transmit the read data to the host, based on whether a current state of a flag corresponding to the acquired physical address is set to the first value or the second value.

2. The memory system of claim 1, wherein
the controller is further configured to:
when writing the first data to the nonvolatile memory, write the first data and the first physical together to the first storage location;
when reading the first data from the nonvolatile memory, read data and a physical address together from the nonvolatile memory, based on the physical address acquired from the first management table; and
determine whether or not to transmit the data read from the non-volatile memory to the host based on whether or not a first condition is satisfied, the first condition being a condition that the current state of the flag corresponding to the physical address acquired from the first management table is set to the first value and further the physical address read from the nonvolatile memory matches the physical address acquired from the first management table.

3. The memory system of claim 1, wherein
the controller is further configured to:
acquire, from the second management table, the flag corresponding to the physical address acquired from the first management table;
determine whether the acquired flag is set to the first value or the second value; and
determine, based on a result of the determining, whether or not to transmit the read data to the host.

4. The memory system of claim 1, wherein
the controller is further configured to: when writing the first data to the nonvolatile memory, generate a first check code for checking integrity of information that contains the first data and a flag having the first value, using the first data and the flag having the first value;
write the first data and the first check code together to the first storage location;
when reading the first data from the nonvolatile memory, read data and a check code together from the nonvolatile memory, based on the physical address acquired from the first management table;
acquire, from the second management table, the flag corresponding to the physical address acquired from the first management table;
generate a second check code for checking integrity of information that contains the acquired flag and the read data, using the acquired flag and the read data; and
determine whether or not to transmit the read data to the host, based on whether or not the second check code matches the read check code.

5. The memory system of claim 1, wherein
the controller is further configured to:
when writing the first data to the nonvolatile memory, generate a first check code for checking integrity of information that contains the first data, a flag having the first value, and the first physical address, using the first data, the flag having the first value, and the first physical address;
write the first data and the first check code together to the first storage location;
when reading the first data from the nonvolatile memory, read data and a check code together from the nonvolatile memory, based on the physical address acquired from the first management table;
acquire, from the second management table, the flag corresponding to the physical address acquired from the first management table;
generate a second check code for checking integrity of information that contains the acquired flag and the read data, using the acquired flag and the read data; and
determine whether or not to transmit the read data to the host, based on whether or not the second check code matches the read check code.

6. A memory system connectable to a host, comprising:
a nonvolatile memory; and
a controller configured to control the nonvolatile memory, wherein
the controller is configured to:
manage mapping information using a first management table, the mapping information indicating a mapping between a plurality of logical addresses used by the host to access the memory system and a plurality of physical addresses of the nonvolatile memory;
in response to receiving a write command specifying a first logical address from the host, allocate a first physical address to the first logical address, and write first data and first additional information together to a first storage location of the nonvolatile memory, the first storage location corresponding to the first physical address, the first data being data associated with the write command, the first additional information being information determined directly or indirectly from the first physical address;
in response to receiving a read command specifying the first logical address from the host, acquire from the first management table a physical address that has been mapped to the first logical address at the time of execution of the read command, and read data and additional information together from the nonvolatile memory, based on the acquired physical address; and
determine whether or not to transmit the read data to the host, based on whether or not the read additional information matches additional information that is determined directly or indirectly from the physical address acquired from the first management table.

7. The memory system of claim 6, wherein
the controller is configured to:
manage a plurality of flags using a second management table, the plurality of flags being respectively associated with the plurality of physical addresses, each of the plurality of flags being set to either a first value or a second value, the first value indicating that data stored in a storage location of the nonvolatile memory corresponding to an associated physical address is valid data, the second value indicating that data stored in the storage location of the nonvolatile memory corresponding to the associated physical address is invalid data;
in response to that the first data and the first additional information are written together to the first storage location, set a first flag corresponding to the first physical address to the first value;
in response to that the first data is made invalid data by updating or deleting of the first data, set the first flag to the second value; and
determine whether or not to transmit the read data to the host based on whether or not a first condition is satisfied, the first condition being a condition that the read additional information matches the additional information directly or indirectly determined from the physical address acquired from the first management table and further a current state of the flag corresponding to the physical address acquired from the first management table is set to the first value.

8. The memory system of claim 6, wherein
each of the first additional information and the read additional information is a physical address, and
the controller is further configured to:
when writing the first data to the nonvolatile memory, write the first data and the first physical address together to the first storage location;
when reading the first data from the nonvolatile memory, read data and a physical address together from the nonvolatile memory, based on the physical address acquired from the first management table; and
determine whether or not to transmit the read data to the host based on whether or not the read physical address matches the physical address acquired from the first management table.

9. The memory system of claim 6, wherein
each of the first additional information and the read additional information is an check code, and
the controller is further configured to:
when writing the first data to the nonvolatile memory, generate a first check code for checking integrity of information that contains the first data and the first physical address, using the first data and the physical address;
write the first data and the first check code together to the first storage location;
when reading the first data from the nonvolatile memory, read data and a check code together from the nonvolatile memory, based on the physical address acquired from the first management table;
generate a second check code for checking integrity of information that contains the physical address acquired from the first management table and the read data, using the physical address acquired from the first management table and the read data; and
determine whether or not to transmit the read data to the host based on whether or not the second check code matches the read check code.

10. The memory system of claim 6, wherein
each of the first additional information and the read additional information is a physical address, and
the controller is further configured to:
manage a plurality of flags using a second management table, the plurality of flags being respectively associated with the plurality of physical addresses, each of the plurality of flags being set to either a first value or a second value, the first value indicating that data stored in a storage location of the nonvolatile memory corresponding to an associated physical address is valid data, the second value indicating that data stored in the storage location of the nonvolatile memory corresponding to the associated physical address is invalid data;

in response to that the first data and the first additional information are written together to the first storage location, set a first flag corresponding to the first physical address to the first value;

in response to that the first data is made invalid data by updating or deleting of the first data, set the first flag to the second value;

when writing the first data to the nonvolatile memory, generate a first check code for checking integrity of information that contains the first data, a flag having the first value, and the first physical address, using the first data, the flag having the first value, and the first physical address;

write the first data and the first check code together to the first storage location;

when reading the first data from the nonvolatile memory data, read data and a check code together from the nonvolatile memory, based on the physical address acquired from the first management table;

acquire, from the second management table, a flag corresponding to the physical address acquired from the first management table;

generate a second check code for checking integrity of information that contains the physical address acquired from the first management table, the acquired flag, and the read data, using the physical address acquired from the first management table, the acquired flag, and the read data; and determine whether or not to transmit the read data to the host, based on whether or not the second check code matches the read check code.

11. A method of controlling a memory system including a nonvolatile memory, the method comprising:

managing mapping information using a first management table, the mapping information indicating a mapping between a plurality of logical addresses used by a host to access the memory system and a plurality of physical addresses of the nonvolatile memory;

managing a plurality of flags using a second management table, the plurality of flags being respectively associated with the plurality of physical addresses, each of the plurality of flags being set to either a first value or a second value, the first value indicating that data stored in a storage location of the nonvolatile memory corresponding to an associated physical address is valid data, the second value indicating that data stored in the storage location of the nonvolatile memory corresponding to the associated physical address is invalid data;

in response to receiving a write command specifying a first logical address from the host, allocating a first physical address to the first logical address, writing first data associated with the write command to a first storage location of the nonvolatile memory corresponding to the first physical address, and setting a first flag corresponding to the first physical address to the first value;

in response to that the first data is made invalid data by updating or deleting of the first data, setting the first flag to the second value; and in response to receiving a read command specifying the first logical address from the host, acquiring from the first management table a physical address that has been mapped to the first logical address at a time of execution of the read command, reading data from the nonvolatile memory based on the acquired physical address, and determining whether or not to transmit the read data to the host, based on whether a current state of a flag corresponding to the acquired physical address is set to the first value or the second value.

12. The method of claim 11, further comprising:

when writing the first data to the nonvolatile memory, writing the first data and the first physical together to the first storage location;

when reading the first data from the nonvolatile memory, reading data and a physical address together from the nonvolatile memory, based on the physical address acquired from the first management table; and determining whether or not to transmit the data read from the non-volatile memory to the host based on whether or not a first condition is satisfied, the first condition being a condition that the current state of the flag corresponding to the physical address acquired from the first management table is set to the first value and further the physical address read from the nonvolatile memory matches the physical address acquired from the first management table.

13. The method of claim 11, further comprising:

acquiring, from the second management table, the flag corresponding to the physical address acquired from the first management table;

determining whether the acquired flag is set to the first value or the second value; and determining, based on a result of the determining, whether or not to transmit the read data to the host.

14. The method of claim 11, further comprising:

when writing the first data to the nonvolatile memory, generating a first check code for checking integrity of information that contains the first data and a flag having the first value, using the first data and the flag having the first value;

writing the first data and the first check code together to the first storage location;

when reading the first data from the nonvolatile memory, reading data and a check code together from the nonvolatile memory, based on the physical address acquired from the first management table;

acquiring, from the second management table, the flag corresponding to the physical address acquired from the first management table;

generating a second check code for checking integrity of information that contains the acquired flag and the read data, using the acquired flag and the read data; and determining whether or not to transmit the read data to the host, based on whether or not the second check code matches the read check code.

15. The method of claim 11, further comprising:

when writing the first data to the nonvolatile memory, generating a first check code for checking integrity of information that contains the first data, a flag having the first value, and the first physical address, using the first data, the flag having the first value, and the first physical address;

writing the first data and the first check code together to the first storage location;

when reading the first data from the nonvolatile memory, reading data and a check code together from the nonvolatile memory, based on the physical address acquired from the first management table;

acquiring, from the second management table, the flag corresponding to the physical address acquired from the first management table;

generating a second check code for checking integrity of information that contains the acquired flag and the read data, using the acquired flag and the read data; and determining whether or not to transmit the read data to the host, based on whether or not the second check code matches the read check code.

16. A method of controlling a memory system including a nonvolatile memory, the method comprising:

managing mapping information using a first management table, the mapping information indicating a mapping between a plurality of logical addresses used by the host to access the memory system and a plurality of physical addresses of the nonvolatile memory;

in response to receiving a write command specifying a first logical address from the host, allocating a first physical address to the first logical address, and writing first data and first additional information together to a first storage location of the nonvolatile memory, the first storage location corresponding to the first physical address, the first data being data associated with the write command, the first additional information being information determined directly or indirectly from the first physical address;

in response to receiving a read command specifying the first logical address from the host, acquiring a physical address that has been mapped to the first logical address at the time of execution of the read command, from the first management table, and reading data and additional information together from the nonvolatile memory, based on the acquired physical address; and determining whether or not to transmit the read data to the host, based on whether or not the read additional information matches additional information that is determined directly or indirectly from the physical address acquired from the first management table.

17. The method of claim 16, further comprising:

managing a plurality of flags using a second management table, the plurality of flags being respectively associated with the plurality of physical addresses, each of the plurality of flags being set to either a first value or a second value, the first value indicating that data stored in a storage location of the nonvolatile memory corresponding to an associated physical address is valid data, the second value indicating that data stored in the storage location of the nonvolatile memory corresponding to the associated physical address is invalid data;

in response to that the first data and the first additional information are written together to the first storage location, setting a first flag corresponding to the first physical address to the first value;

in response to that the first data is made invalid data by updating or deleting of the first data, setting the first flag to the second value; and determining whether or not to transmit the read data to the host based on whether or not a first condition is satisfied, the first condition being a condition that the read additional information matches the additional information directly or indirectly determined from the physical address acquired from the first management table and further a current state of the flag corresponding to the physical address acquired from the first management table is set to the first value.

18. The method of claim 16, wherein each of the first additional information and the read additional information is a physical address, and the method further comprises:

when writing the first data to the nonvolatile memory, writing the first data and the first physical address together to the first storage location;

when reading the first data from the nonvolatile memory, reading data and a physical address together from the nonvolatile memory, based on the physical address acquired from the first management table; and determining whether or not to transmit the read data to the host based on whether or not the read physical address matches the physical address acquired from the first management table.

19. The method of claim 16, wherein each of the first additional information and the read additional information is an check code, and the method further comprises:

when writing the first data to the nonvolatile memory, generating a first check code for checking integrity of information that contains the first data and the first physical address, using the first data and the physical address;

write the first data and the first check code together to the first storage location;

when reading the first data from the nonvolatile memory, reading data and a check code together from the nonvolatile memory, based on the physical address acquired from the first management table;

generating a second check code for checking integrity of information that contains the physical address acquired from the first management table and the read data, using the physical address acquired from the first management table and the read data; and determining whether or not to transmit the read data to the host based on whether or not the second check code matches the read check code.

20. The method of claim 16, wherein each of the first additional information and the read additional information is a physical address, and the method further comprises:

managing a plurality of flags using a second management table, the plurality of flags being respectively associated with the plurality of physical addresses, each of the plurality of flags being set to either a first value or a second value, the first value indicating that data stored in a storage location of the nonvolatile memory corresponding to an associated physical address is valid data, the second value indicating that data stored in the storage location of the nonvolatile memory corresponding to the associated physical address is invalid;

in response to that the first data and the first additional information are written together to the first storage location, setting a first flag corresponding to the first physical address to the first value;

in response to that the first data is made invalid data by updating or deleting of the first data; setting the first flag to the second value;

when writing the first data to the nonvolatile memory, generating a first check code for checking integrity of information that contains the first data, a flag having the first value, and the first physical address, using the first data, the flag having the first value, and the first physical address;

writing the first data and the first check code together to the first storage location;

when reading the first data from the nonvolatile memory data, reading data and a check code together from the nonvolatile memory, based on the physical address acquired from the first management table;

acquiring, from the second management table, a flag corresponding to the physical address acquired from the first management table;

generating a second check code for checking integrity of information that contains the physical address acquired from the first management table, the acquired flag, and the read data, using the physical address acquired from the first management table, the acquired flag, and the read data; and determining whether or not to transmit the read data to the host, based on whether or not the second check code matches the read check code.

* * * * *